(12) United States Patent
Ishimura et al.

(10) Patent No.: US 12,019,419 B2
(45) Date of Patent: Jun. 25, 2024

(54) CONTROL SYSTEM AND CONTROL APPARATUS

(71) Applicant: OMRON CORPORATION, Kyoto (JP)

(72) Inventors: Akihiro Ishimura, Ritto (JP); Kojiro Baba, Kusatsu (JP); Taishi Kawaguchi, Kyoto (JP); Norihiro Maekawa, Takatsuki (JP)

(73) Assignee: OMRON CORPORATION, Kyoto (JP)

( * ) Notice: Subject to any disclaimer, the term of this patent is extended or adjusted under 35 U.S.C. 154(b) by 307 days.

(21) Appl. No.: 17/434,834

(22) PCT Filed: Feb. 14, 2020

(86) PCT No.: PCT/JP2020/005795
§ 371 (c)(1),
(2) Date: Aug. 30, 2021

(87) PCT Pub. No.: WO2020/184063
PCT Pub. Date: Sep. 17, 2020

(65) Prior Publication Data
US 2022/0147006 A1  May 12, 2022

(30) Foreign Application Priority Data
Mar. 14, 2019  (JP) ................. 2019-047443

(51) Int. Cl.
*G05B 19/042* (2006.01)
*H04L 61/5038* (2022.01)
(52) U.S. Cl.
CPC ..... *G05B 19/0421* (2013.01); *G05B 19/0428* (2013.01); *H04L 61/5038* (2022.05);
(Continued)

(58) Field of Classification Search
CPC .............. H04L 61/5038; G05B 19/042; G05B 19/0421; G05B 19/0428;
(Continued)

(56) References Cited

U.S. PATENT DOCUMENTS 6,717,515 B1  4/2004  Osako et al.
8,392,638 B2  3/2013  Hsieh
(Continued)

FOREIGN PATENT DOCUMENTS

CN  103403720 A  11/2013
CN  103404082 A  11/2013
(Continued)

OTHER PUBLICATIONS

Extended European Search Report dated Nov. 8, 2022, issued in European Application No. 20769034.8.
(Continued)

*Primary Examiner* — Kidest Bahta
(74) *Attorney, Agent, or Firm* — Sughrue Mion, PLLC

(57) ABSTRACT

A control system includes a control apparatus functioning as a master, and plural slaves which are network-connected to the control apparatus. The slaves each have identification information. The control apparatus includes executes a first instruction to set specified identification information to each of one or more specified slaves. The control apparatus outputs first error information indicating which slave that the setting of the identification information to which is failed, among the one or more specified slaves.

16 Claims, 22 Drawing Sheets

(52) U.S. Cl.
CPC .............. *G05B 2219/1113* (2013.01); *G05B 2219/2231* (2013.01)

(58) Field of Classification Search
CPC .. G05B 2219/1113; G05B 2219/21005; G05B 2219/2231; G05B 23/00
See application file for complete search history.

(56) References Cited

U.S. PATENT DOCUMENTS

| | | |
|---|---|---|
| 10,126,966 B1 | 11/2018 | Serebrin et al. |
| 2002/0069313 A1 | 6/2002 | Douniwa et al. |
| 2003/0091059 A1* | 5/2003 | Pike ................ H04L 49/351 370/468 |
| 2004/0163008 A1 | 8/2004 | Kim |
| 2004/0184476 A1 | 9/2004 | Mrasek |
| 2004/0221085 A1* | 11/2004 | Bee ................ G06F 13/4291 710/306 |
| 2005/0289269 A1* | 12/2005 | Nakayama ........... G06F 13/409 710/110 |
| 2010/0241695 A1 | 9/2010 | Sagara |
| 2011/0197000 A1* | 8/2011 | Hsieh ................ G06F 13/42 710/110 |
| 2014/0047056 A1 | 2/2014 | Tahara et al. |
| 2014/0082116 A1 | 3/2014 | Sasaki et al. |
| 2014/0121785 A1 | 5/2014 | Ismail et al. |
| 2014/0122631 A1 | 5/2014 | Tahara et al. |
| 2014/0163742 A1 | 6/2014 | Element |
| 2015/0095536 A1 | 4/2015 | Lee |
| 2015/0193297 A1 | 7/2015 | Ngo et al. |
| 2016/0246552 A1 | 8/2016 | Hamada et al. |
| 2017/0075336 A1 | 3/2017 | Ueda |
| 2017/0250883 A1 | 8/2017 | Sawada et al. |
| 2018/0157233 A1* | 6/2018 | Mizumoto ............ H04L 41/12 |
| 2018/0227214 A1 | 8/2018 | Huang et al. |
| 2018/0234301 A1 | 8/2018 | Ozaki et al. |
| 2018/0334114 A1 | 11/2018 | Sugimoto |
| 2020/0186493 A1 | 6/2020 | Bürkert et al. |
| 2021/0111977 A1 | 4/2021 | Watanabe et al. |

FOREIGN PATENT DOCUMENTS

| | | |
|---|---|---|
| CN | 103460650 A | 12/2013 |
| CN | 107925596 A | 4/2018 |
| CN | 108156016 A | 6/2018 |
| CN | 108928308 A | 12/2018 |
| EP | 1 594 023 A2 | 11/2005 |
| EP | 2 688 002 A1 | 1/2014 |
| EP | 2 937 751 A1 | 10/2015 |
| EP | 3 267 609 A1 | 1/2018 |
| EP | 3 333 657 A1 | 6/2018 |
| JP | 2001-331393 A | 11/2001 |
| JP | 3988753 B2 | 10/2007 |
| JP | 2009-239429 A | 10/2009 |
| JP | 2012-099997 A | 5/2012 |
| JP | 2014-119907 A | 6/2014 |
| JP | 2014-119912 A | 6/2014 |
| JP | 2014-146070 A | 8/2014 |
| JP | 2014-230097 A | 12/2014 |
| JP | 2015-104266 A | 6/2015 |
| JP | 2015-176369 A | 10/2015 |
| JP | 2016-58944 A | 4/2016 |
| JP | 2016-157414 A | 9/2016 |
| JP | 2017-155475 A | 9/2017 |
| JP | 2018-93382 A | 6/2018 |
| JP | 2019-47441 A | 3/2019 |
| WO | 2010/089810 A1 | 8/2010 |
| WO | 2012/124159 A1 | 9/2012 |
| WO | 2019/020674 A1 | 1/2019 |

OTHER PUBLICATIONS

Extended European Search Report dated Nov. 8, 2022, issued in European Application No. 20769405.0.
Extended European Search Report dated Nov. 7, 2022, issued in European Application No. 20768964.7.
International Search Report of PCT/JP2020/005795 dated May 12, 2020 [PCT/ISA/210].
Written Opinion of PCT/JP2020/005795 dated May 12, 2020 [PCT/ISA/237].
Communication dated Jul. 29, 2022 from the Chinese Patent Office in Chinese Application No. 202080017588.5.
Communication dated Aug. 1, 2022 from the Chinese Patent Office in Chinese Application No. 202080017709.6.
Office Action dated May 27, 2022 in Chinese Application No. 202080017545.7.
Chinese Office Action dated Jun. 20, 2023 in Application No. 202080017709.6.
Notice of Reasons for Refusal dated May 10, 2022 from the Japanese Patent Office in Japanese Application No. 2019-047443.
Chinese Office Action dated Jan. 19, 2023 in Chinese Application No. 202080017709.6.
Office Action issued Dec. 22, 2023 in U.S. Appl. No. 17/434,782.
Office Action issued Jan. 3, 2024 in U.S. Appl. No. 17/434,837.

* cited by examiner

FIG.2
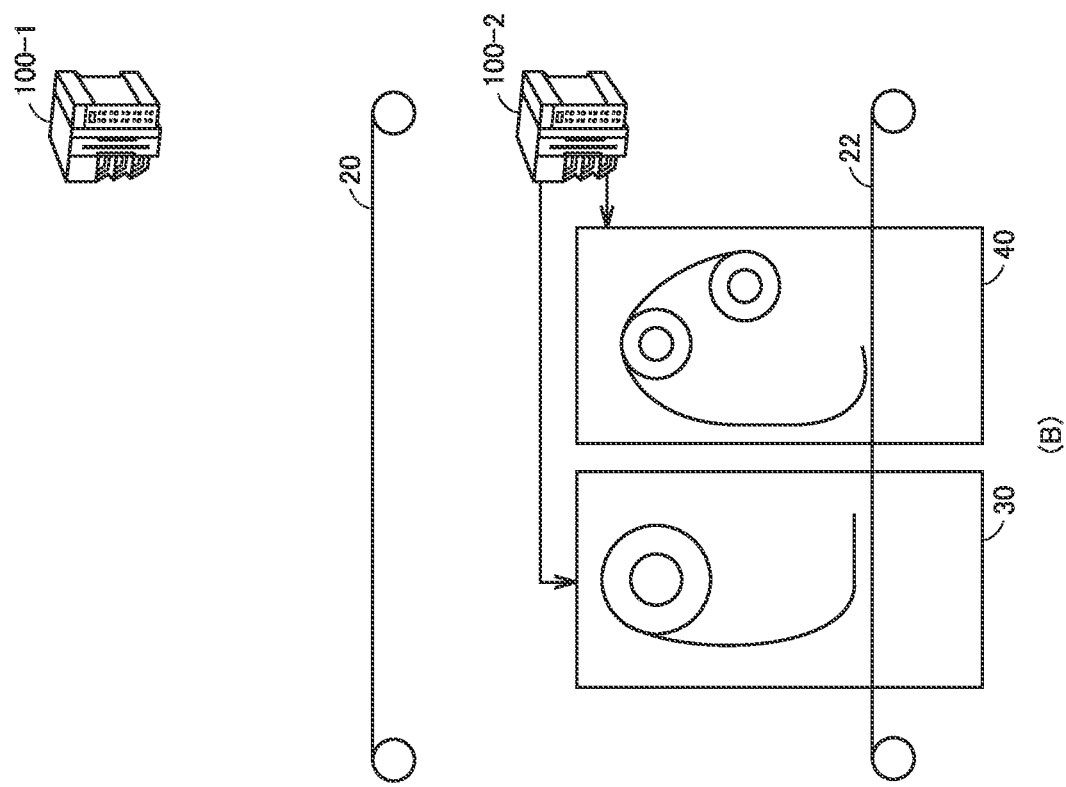
(A)
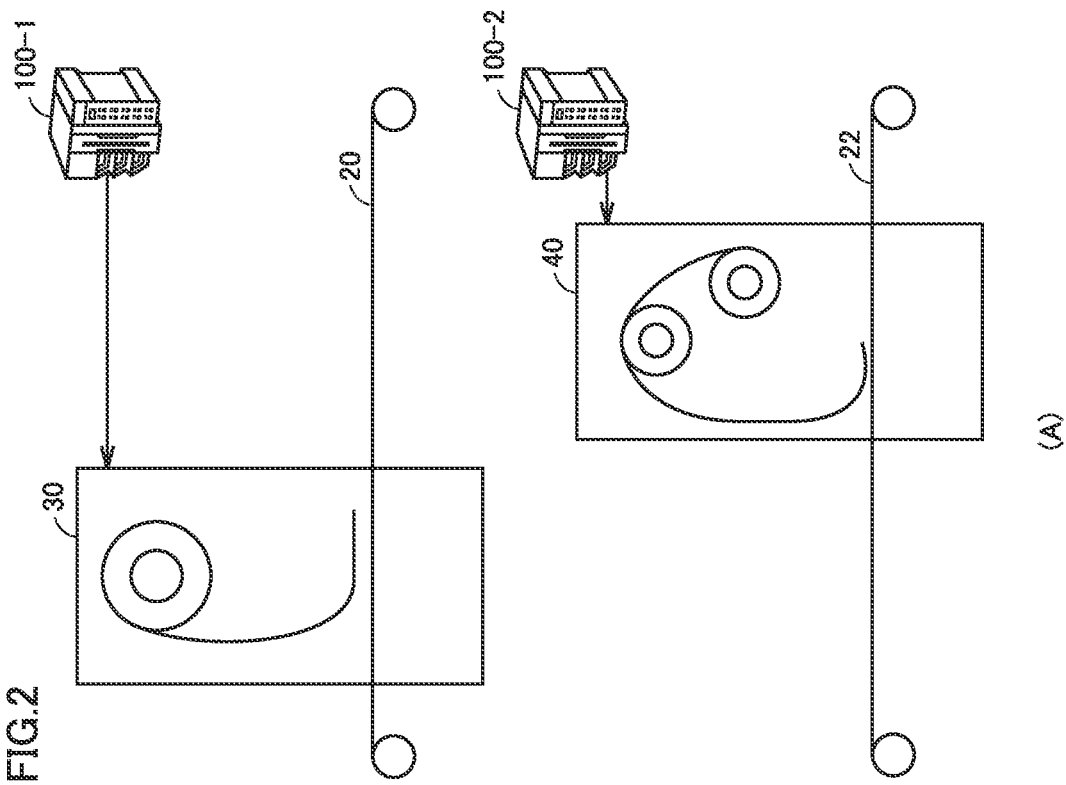
(B)

CONFIGURATION INFORMATION 134

FIG.12

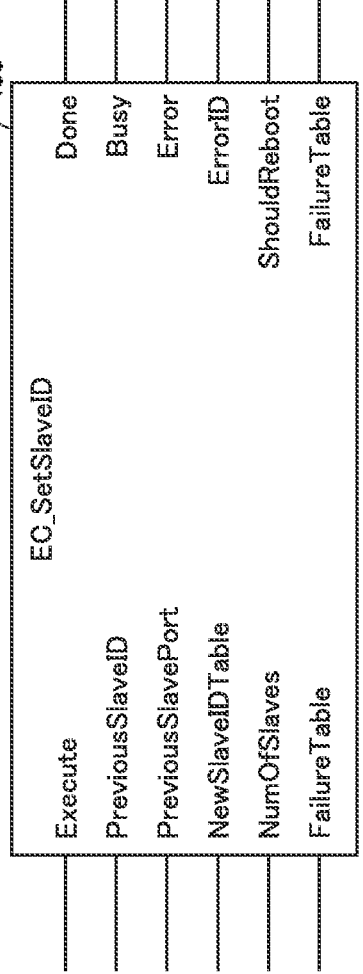

| INPUT VARIABLE | NAME | DATA TYPE |
|---|---|---|
| Execute | EXECUTION CONDITION TRUE FOR EXECUTION | BOOL |
| PreviousSlaveID | SLAVE ID OF REFERENCE SLAVE | UINT |
| PreviousSlavePort | PORT NAME OF REFERENCE SLAVE | STRING |
| NewSlaveIDTable | SLAVE ID TO BE SET | UINT[] |
| NumOfSlaves | NUMBER OF TARGET SLAVES | UINT |
| FailureTable[] | FAILURE RESULT TABLE | BOOL[] |

401 — Execute
402 — PreviousSlaveID
403 — PreviousSlavePort
404 — NewSlaveIDTable
405 — NumOfSlaves
406 — FailureTable[]

| OUTPUT VARIABLE | NAME | DATA TYPE |
|---|---|---|
| Done | NORMALLY TERMINATED | BOOL |
| Busy | IN PROCESS | BOOL |
| Error | ABNORMALLY TERMINATED | BOOL |
| ErrorID | ERROR ID | WORD |
| ShouldReboot | REBOOT REQUIRED | BOOL |
| FailureTable[] | FAILURE RESULT TABLE | BOOL[] |

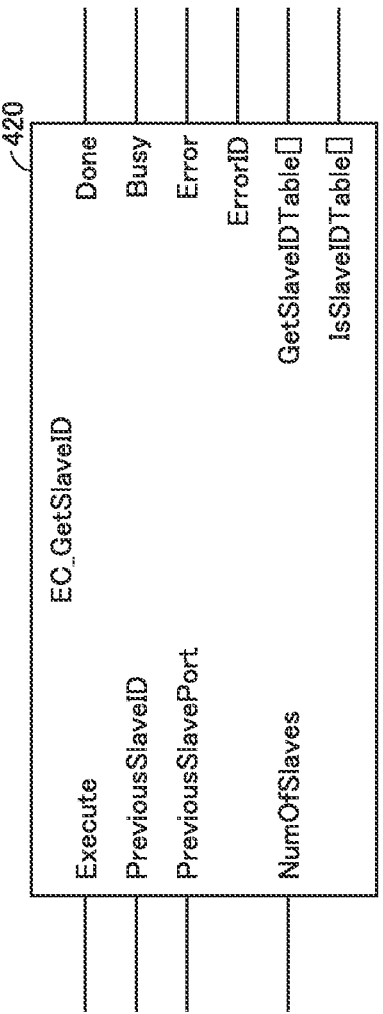

| INPUT VARIABLE | NAME | DATA TYPE |
|---|---|---|
| Execute | EXECUTION CONDITION TRUE FOR EXECUTION | BOOL |
| PreviousSlaveID | SLAVE ID OF REFERENCE SLAVE | UINT |
| PreviousSlavePort | PORT NAME OF REFERENCE SLAVE | STRING |
| NumOfSlaves | NUMBER OF TARGET SLAVES | UINT |

| OUTPUT VARIABLE | NAME | DATA TYPE |
|---|---|---|
| Done | NORMALLY TERMINATED | BOOL |
| Busy | IN PROCESS | BOOL |
| Error | ABNORMALLY TERMINATED | BOOL |
| ErrorID | ERROR ID | WORD |
| GetSlaveIDTable[] | ID ACQUISITION TABLE | UINT[] |
| IsSlaveIDTable[] | ACQUISITION RESULT TABLE | BOOL[] |

FIG.17
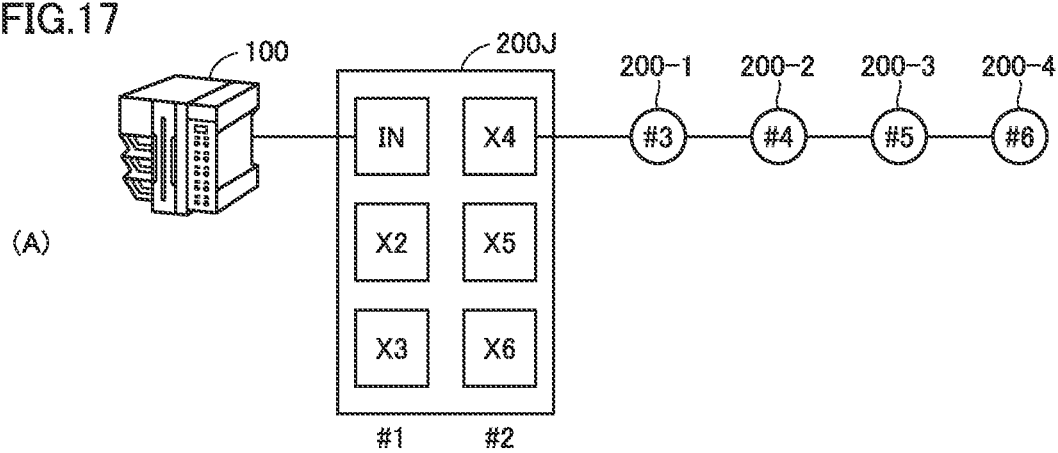
(A)
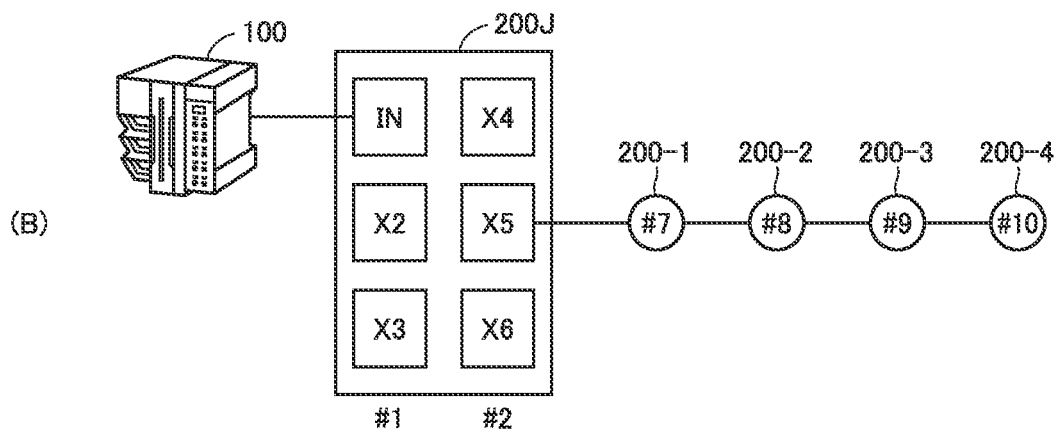
(B)

FIG.19
(A) 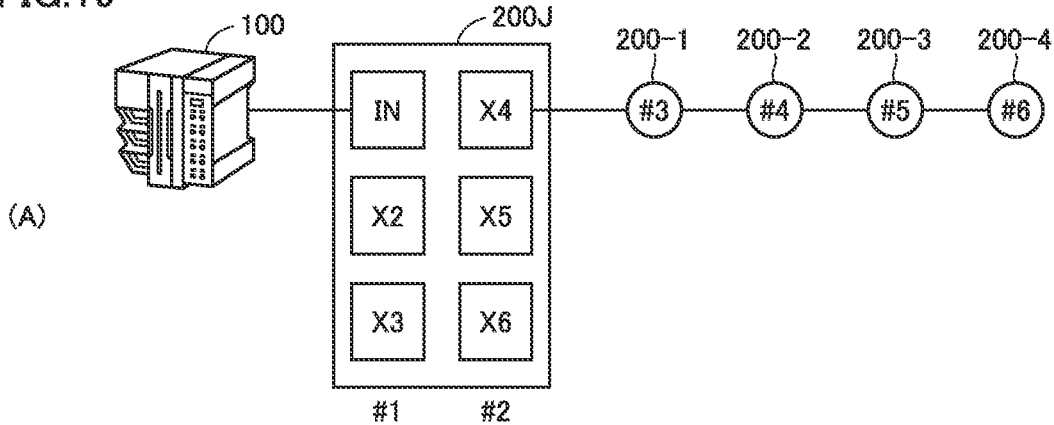
(B) 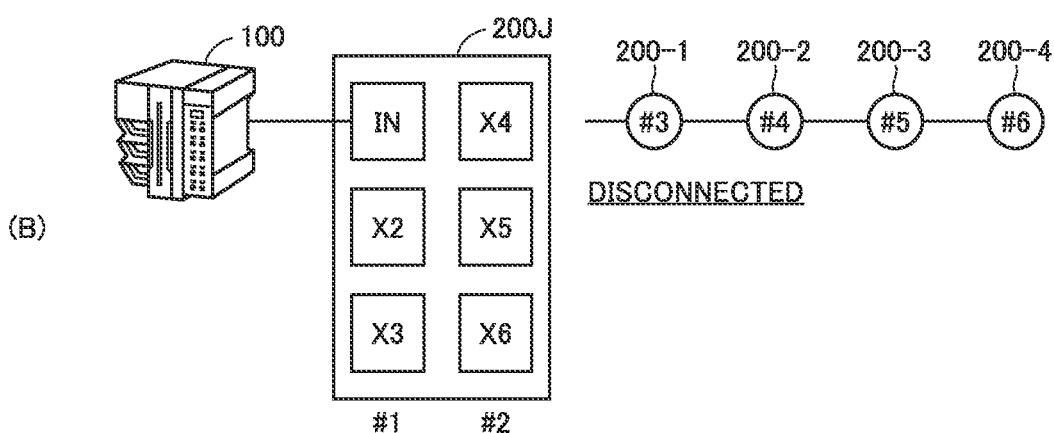
(C) 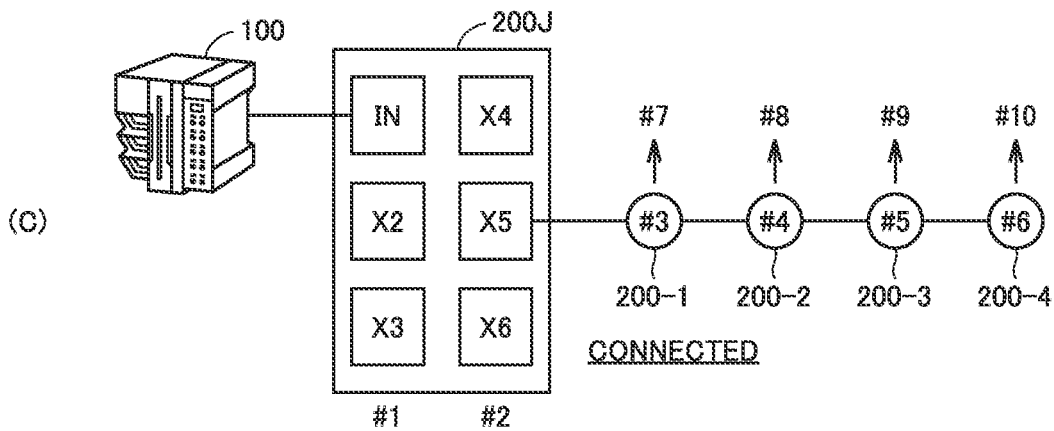

FIG.20
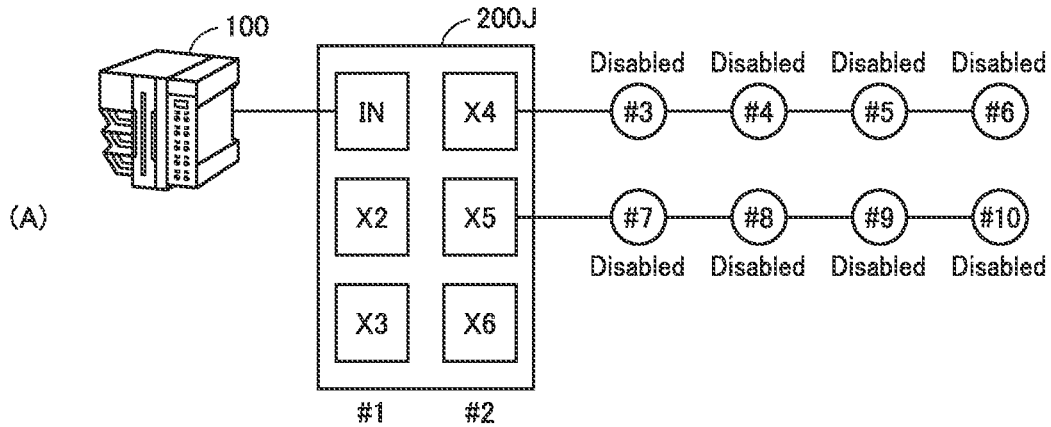
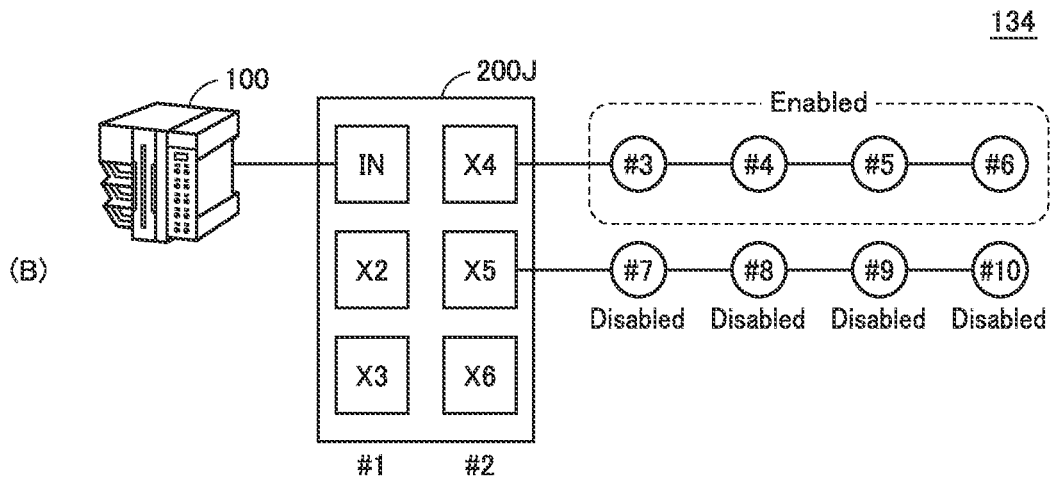
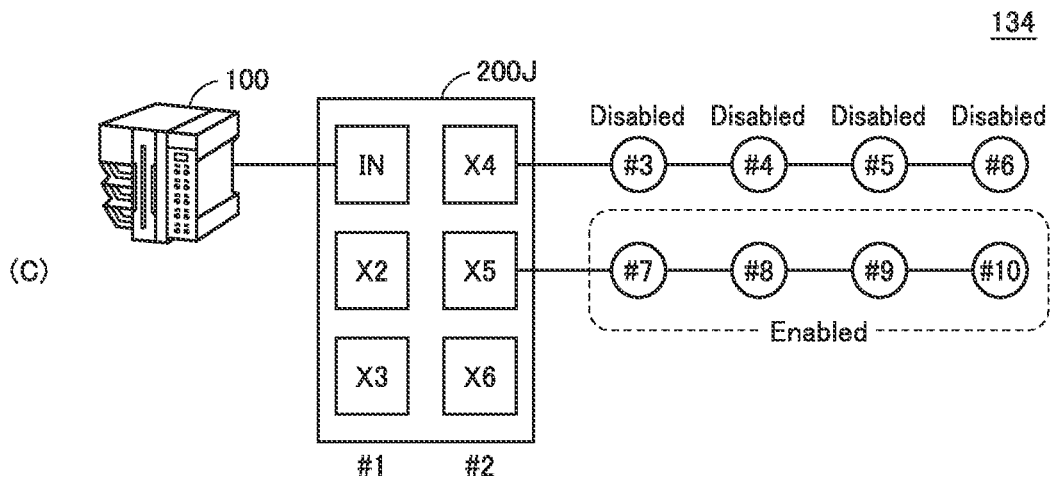

CONTROL SYSTEM AND CONTROL APPARATUS

CROSS REFERENCE TO RELATED APPLICATIONS

This application is a National Stage of International Application No. PCT/JP2020/005795, filed Feb. 14, 2020, claiming priority to Japanese Patent Application No. 2019-047443, filed Mar. 14, 2019, the entire contents of each of which being herein incorporated by reference in their entireties.

TECHNICAL FIELD

The present invention relates to a control system which includes a slave network-connected to the control system, and a control apparatus for use by the control system.

BACKGROUND ART

In the area of factory automation (FA), a control system is popular which includes a control apparatus and one or more slaves which are network-connected to the control apparatus. As the slave, an apparatus is assumed which provides any processing capabilities, such as an input/output device, a robot control, a vision sensor, etc. Typically, the control apparatus functions a master.

The control apparatus exchanges data with each slave, and thus needs to identify each slave. The information for identifying a slave is referred to as a slave ID (identification information), a network ID (identification information), a network address, and a node address.

The number of slaves and the connection arrangement of the slaves are appropriately determined, depending on a control object, or may be added or changed after such determination is made. In such a case, the information for identifying each slave also needs to be reloaded as appropriate.

For example, Japanese Patent Laying-Open No. 2015-176369 (PTL 1) discloses a configuration which allows a group name, a device name, a network address, and a node address to be flexibly set for each device on a user interface screen for setting a group to be provided by a support apparatus.

CITATION LIST

Patent Literature

PTL 1: Japanese Patent Laying-Open No. 2015-176369

SUMMARY OF INVENTION

Technical Problem

For example, a machine changeover, called a changeover, is frequency performed on a manufacturing line for high-mix, low-volume production. When such a changeover occurs, the identification information of a slave needs to be reset or changed. A configuration is demanded for facilitating troubleshooting of a failure that is caused when resetting or changing of the identification information as such.

Solution to Problem

A control system according to a certain aspect of the present invention includes: a control apparatus functioning as a master; and a plurality of slaves which are network-connected to the control apparatus. The plurality of slaves each have identification information. The control apparatus includes an identification information set means configured to execute a first instruction to set specified identification information to each of one or more specified slaves. The identification information set means outputs first error information indicating which slave that the setting of the identification information to which is failed, among the one or more specified slaves. With this aspect, when a failure occurs in simultaneously setting slave identification information to each of one or more specified slaves, the position of a slave that the setting of the identification information to which is failed can be readily identified. This can facilitate troubleshooting.

The identification information set means may output an array of members corresponding to the one or more specified slaves, as the first error information. With this configuration, the information about the presence or absence of an error at each slave is stored in one array. Thus, the handling of such error information can be facilitated.

The first instruction may receive a table name to which the first error information is to be output. With this configuration, the first error information can be stored into any table.

The identification information set means may further output second error information indicating whether setting of the identification information to each of the one or more specified slaves is failed. With this configuration, an operator or the like can readily know a failure of the setting of the identification information to any of the slaves.

The identification information set means may further output third error information indicating a reason for failure in setting of the identification information to each of the one or more specified slaves. With this configuration, the analysis of a cause of failure in setting the identification information to a slave can be facilitated.

The control system may further include a display device configured to visually present a position of a slave that the setting of the identification information to which is failed among the one or more specified slaves, based on the first error information. With this configuration, the operator or like can know at a glance the position of the slave that the setting of the identification information to which is failed among the one or more specified slaves, which can reduce a time required for troubleshooting.

The first instruction may be executed as a part of a user program executed at the control apparatus. With this configuration, the identification information can be set to the slave, without use of a support apparatus or the like.

The control apparatus further includes an identification information read means configured to execute a second instruction, in which any one of the plurality of slaves is specified as a reference slave, to read identification information set to each of specified slaves other than the slave being specified as the reference slave. With this configuration, the identification information can be read from any slave whose identification information is unknown.

The control apparatus may have configuration information defining a connection arrangement of the plurality of slaves. The control apparatus may further include a disable means configured to execute a third instruction to disable some or all slaves included in definition by the configuration information. With this configuration, the process is allowed to continue, without causing an abnormality to occur, even though the configuration information and the actual connection arrangement do not match.

According to another aspect of the present invention, a control apparatus functioning as a master is provided. The control apparatus includes a controller configured to network-connect the control apparatus to a plurality of slaves, the plurality of slaves each having identification information. The control apparatus includes an identification information set means configured to execute a first instruction to set specified identification information to each of one or more specified slaves. The identification information set means outputs first error information indicating which slave the setting of the identification information to which is failed among the one or more specified slaves.

Advantageous Effects of Invention

According to the present invention, troubleshooting of a failure that is caused when resetting or changing the identification information can be facilitated.

BRIEF DESCRIPTION OF DRAWINGS

FIG. 2 is a schematic view for illustrating a background technology according to the present embodiment.

FIG. 12 is a diagram for illustrating a slave ID set instruction as a functional block which is available for a user program of the control apparatus according to the present embodiment.

FIG. 13 is a diagram for illustrating a slave ID read instruction as a functional block which is available for the user program of the control apparatus according to the present embodiment.

FIG. 17 is a diagram for illustrating details of a changeover using the slave ID set instruction according to the present embodiment.

FIG. 19 is a diagram for illustrating changes in connection condition corresponding to the changeover shown in FIG. 17.

FIG. 20 is a diagram for illustrating changes in configuration information corresponding to the changeover shown in FIG. 17.

DESCRIPTION OF EMBODIMENTS

Figure 1:
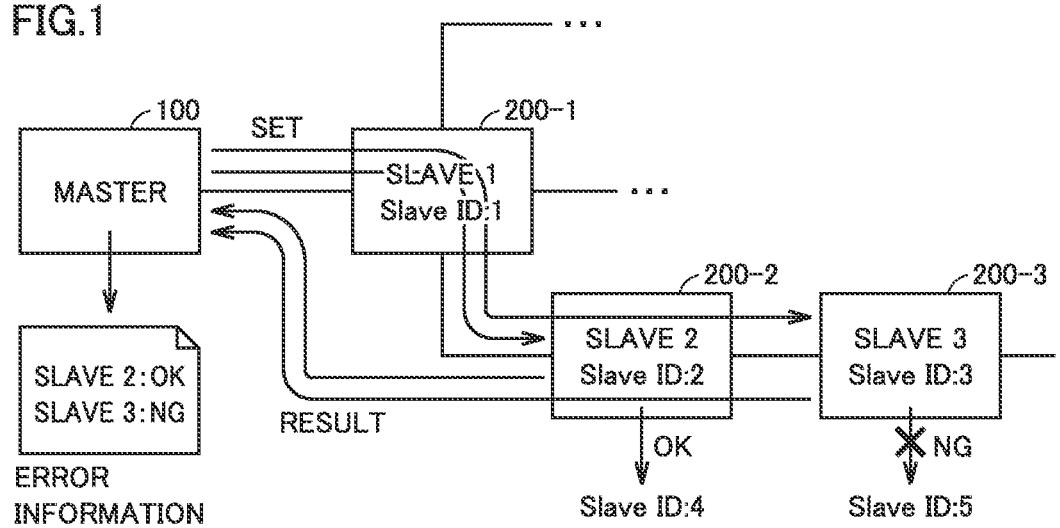
FIG. 1 is a schematic view showing an overall configuration example of a control system according to the present embodiment.

An embodiment according to the present invention will be described, with reference to the accompanying drawings. Note that the same reference sign is used to refer to like or corresponding components in the drawings, and description thereof will not be repeated.

A. Application Example

Initially, referring to FIG. 1, one example scene is described to which the present invention is applied.

FIG. 1 is a schematic view showing an overall configuration example of a control system 1 according to the present embodiment. Referring to FIG. 1, as primary components, the control system 1 includes a control apparatus 100 functioning as a master; and one or more slaves 200-1, 200-2, . . . (hereinafter, also collectively referred to as a "slave 200") which are network-connected to the control apparatus 100.

Preferably, an industrial network, typically, such as EtherCAT (registered trademark), EtherNet/IP (registered trademark), DeviceNet (registered trademark), CompoNet (registered trademark), is employed as the network-connecting the control apparatus 100 and the one or more slaves 200. In the description below, typically, description will be given with reference to EtherCAT as the network. However, other standard or protocol may be employed.

In the control system 1, the slaves 200 each have identification information that can be identified by the control apparatus 100 functioning as the master. In the following, description will be given with reference to a "slave ID" (the details will be described later) as such identification information. However, the identification information is not limited to the "slave ID," and any identification information can be used.

The control apparatus according to the present embodiment can flexibly reset or change (also simply, collectively referred to as "set") the slave ID (the identification information) set to any slave 200. More specifically, the control apparatus 100 executes a predetermined instruction, thereby setting, to one or more specified slaves 200, specified slaves ID (identification information), respectively, at which time the control apparatus 100 outputs error information indicating which slave that the setting of the slave ID to which is failed among the one or more specified slaves. By implementing such an identification information set process, troubleshooting of a failure that is caused when resetting or changing of the identification information can be facilitated.

In the following, terms used herein will be described first.

As used herein, the term "master" collectively refers to an entity or function that manages data transfer over the network. The "master" can include an apparatus (device) itself that manages the data transfer.

As used herein, the term "slave" is an antonym of the master, collectively referring to an entity or function that transfers data over a network of interest, under the management of the master of the network. The "slave" can include an apparatus (device) itself that transfers data.

As used herein, the terms "master" and "slave" distinguish the differences in function related to the data transfer over the network of interest, and functions and relationships other than the data transfer are not particularly limited.

As used herein, the term "configuration information" refers to information indicating definitions of configurations, etc. held by the control apparatus or other device.

As used herein, the term "position address" refers to an address that is determined in accordance with a rule predetermined depending on a topology on the network. For example, the position addresses "0," "0xffff," "0xfffe," and so on may be assigned to the slaves, respectively, in the order starting from a slave closest to the master to a slave farthest away from the master.

As used herein, the term "slave ID" refers to identification information that is given to each slave in order to prevent misidentification of devices from happening, by the master comparing the slave ID with the configuration information. The "slave ID" is flexibly set by the master, and whether the slave is connected to a correct positions is thereby determined. The "slave ID" is also refers to as a "node address." While the "node address" may be set by a rotary switch disposed in the slave, "the slave ID," in the following, is described as being resettable and changeable by the master.

As used herein, the term "unknown slave" refers to a slave whose actual configuration does not match corresponding settings in the configuration information held by the master. In other words, the "unknown slave" refers to a slave that is disposed at a position different from the intended position defined by the configuration information.

B. Background Technology and Needs

Next, background technology and needs according to the present embodiment will be outlined.

For example, high-mix, low-volume production often prevails in manufacturing settings for food, cosmetics, pharmaceuticals, etc. Depending on a product produced, the shape of the product, a type of label attached to the product, and the position of the label attached to the product differ. For this reason, conversion (what is called a "changeover") of the manufacturing line is often performed for each product. In such a manufacturing settings, the changeover is implemented by making general manufacturing modules ready and changing the layout and position of the manufacturing modules as appropriate.

FIG. 2 is a schematic view for illustrating a background technology according to the present embodiment. FIG. 2 shows a configuration example in which two control apparatuses 100-1 and 100-2 control two manufacturing lines, respectively. Part (A) of FIG. 2 shows an example in which a manufacturing module 30 is disposed on a conveyer 20 and a manufacturing module 40 is disposed on a conveyer 22. In the configuration example shown in (A) of FIG. 2, the control apparatus 100-1 controls the manufacturing module 30, and the control apparatus 100-2 controls the manufacturing module 40.

Part (B) of FIG. 2, in contrast, shows a configuration example in which the manufacturing module 30 has been transferred from the conveyer 20 to the conveyer 22. In the configuration example shown in (B) of FIG. 2, the control apparatus 100-2 controls the manufacturing module 30 and the manufacturing module 40.

When a changeover as shown in FIG. 2 takes place, a control object to be controlled by the control apparatus 100 and devices connected to the control apparatus 100 can change. In the following, a way of addressing such a changeover is described.

Figure 3:
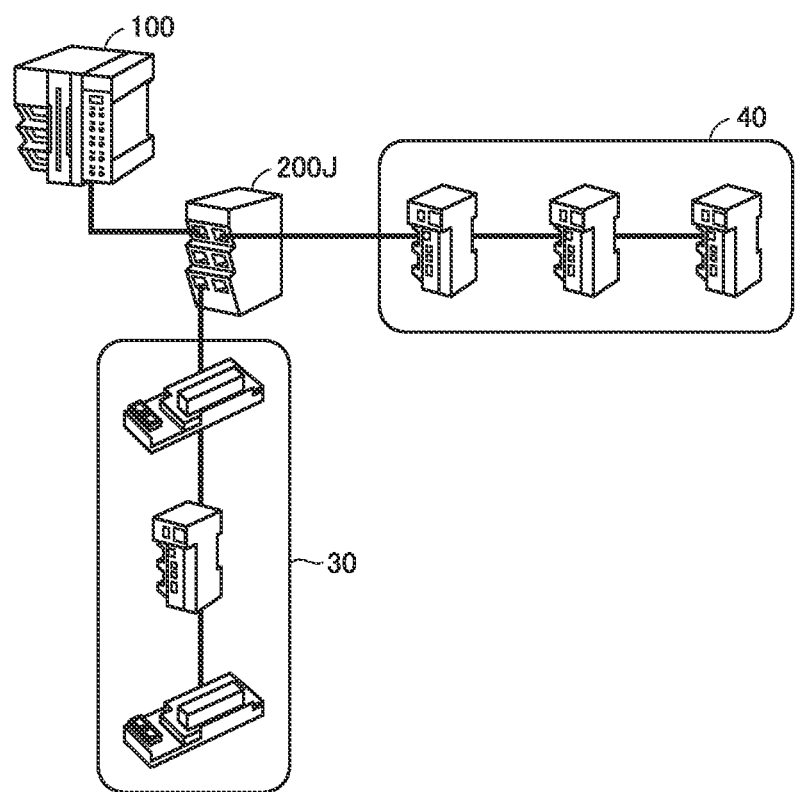
FIG. 3 is a diagram illustrating one example of configuration information held by a control apparatus of FIG. 2.
Figure 4:
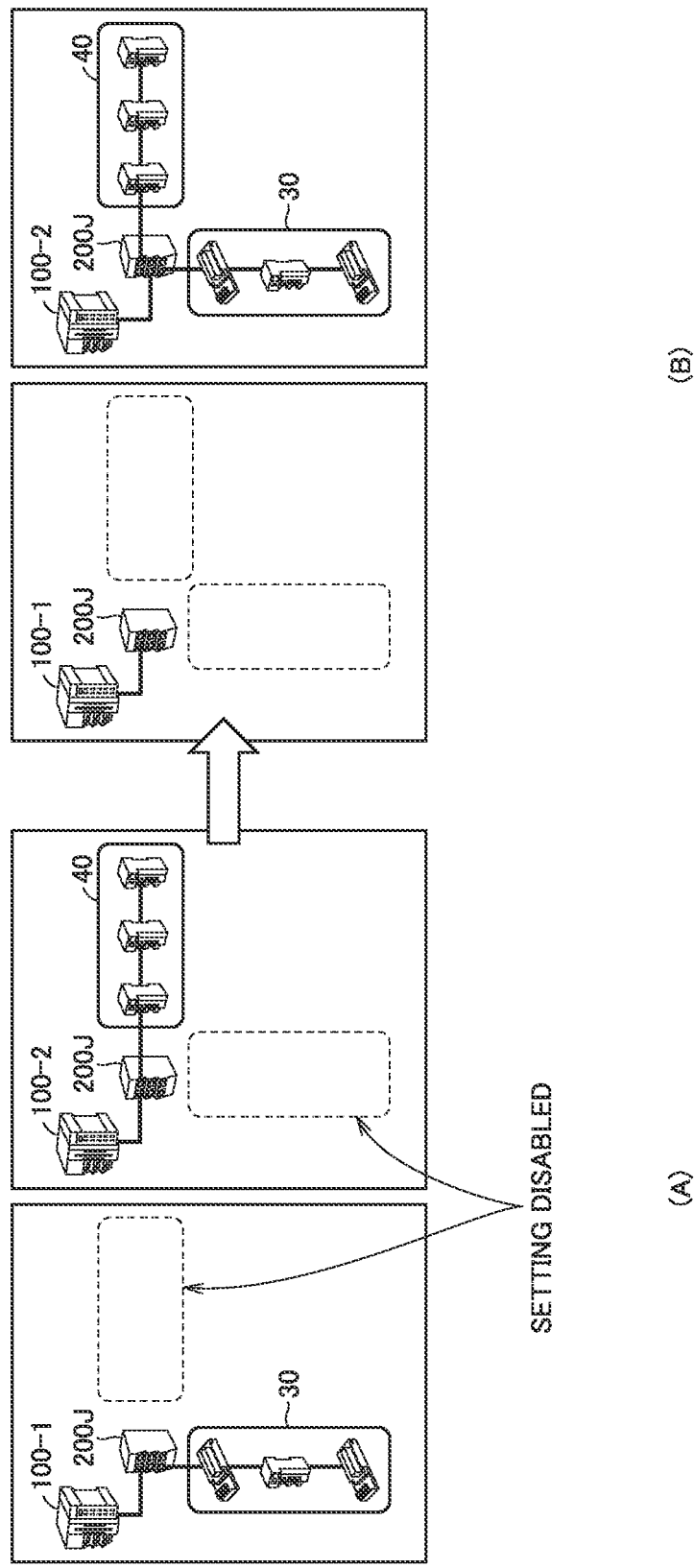
FIG. 4 is a diagram for illustrating changes in configuration information in response to a changeover shown in FIG. 2.

FIG. 3 is a diagram illustrating one example of configuration information held by the control apparatus 100 shown in FIG. 2. FIG. 4 is a diagram for illustrating changes in configuration information in response to the changeover shown in FIG. 2.

The control apparatuses 100-1 and 100-2 each have configuration information (corresponding to configuration information 134 shown in FIG. 5) defining the connection arrangement of the multiple slaves 200 as shown in FIG. 3. More specifically, the configuration information shown in FIG. 3 indicates that a junction slave 200J is connected to the control apparatus 100, a slave included in the manufacturing module 30 is connected to one port of the junction slave 200J, and a slave included in the manufacturing module 40 is connected to another port of the junction slave 200J.

Part (A) of FIG. 4 shows an example setting of the control apparatuses 100-1 and 100-2 corresponding the configuration example shown in (A) of FIG. 2, and (B) of FIG. 4 shows an example setting of the control apparatuses 100-1 and 100-2 corresponding to the configuration example shown in (B) of FIG. 2.

As shown in (A) and (B) of FIG. 4, the settings of slaves corresponding to the manufacturing modules that are not actually present in each of the control apparatuses 100-1 and 100-2 are disabled. More specifically, in the case of (A) of FIG. 4, the settings related to the manufacturing module 40 is disabled for the control apparatus 100-1, and the settings related to the manufacturing module 30 is disabled for the control apparatus 100-2. In the case of (B) of FIG. 4, the settings related to the manufacturing modules 30 and 40 is disabled for the control apparatus 100-1.

As such, information corresponding to a largest connection configuration is included in the configuration information of the control apparatus 100, and the settings for unnecessary slaves in the configuration information are disabled depending on the actual connection configuration, thereby accommodating various changeovers.

The control apparatus 100 according to the present embodiment is capable of resetting and changing the slave ID, in addition to disabling some or all the configuration information as described above. By resetting and changing a slave ID as such, the adaptability for changeovers can be further enhanced.

C. Example Hardware Configuration

An example hardware configuration of primary apparatuses included in the control system according to the present embodiment is described.

c1: Control Apparatus 100

Figure 5:
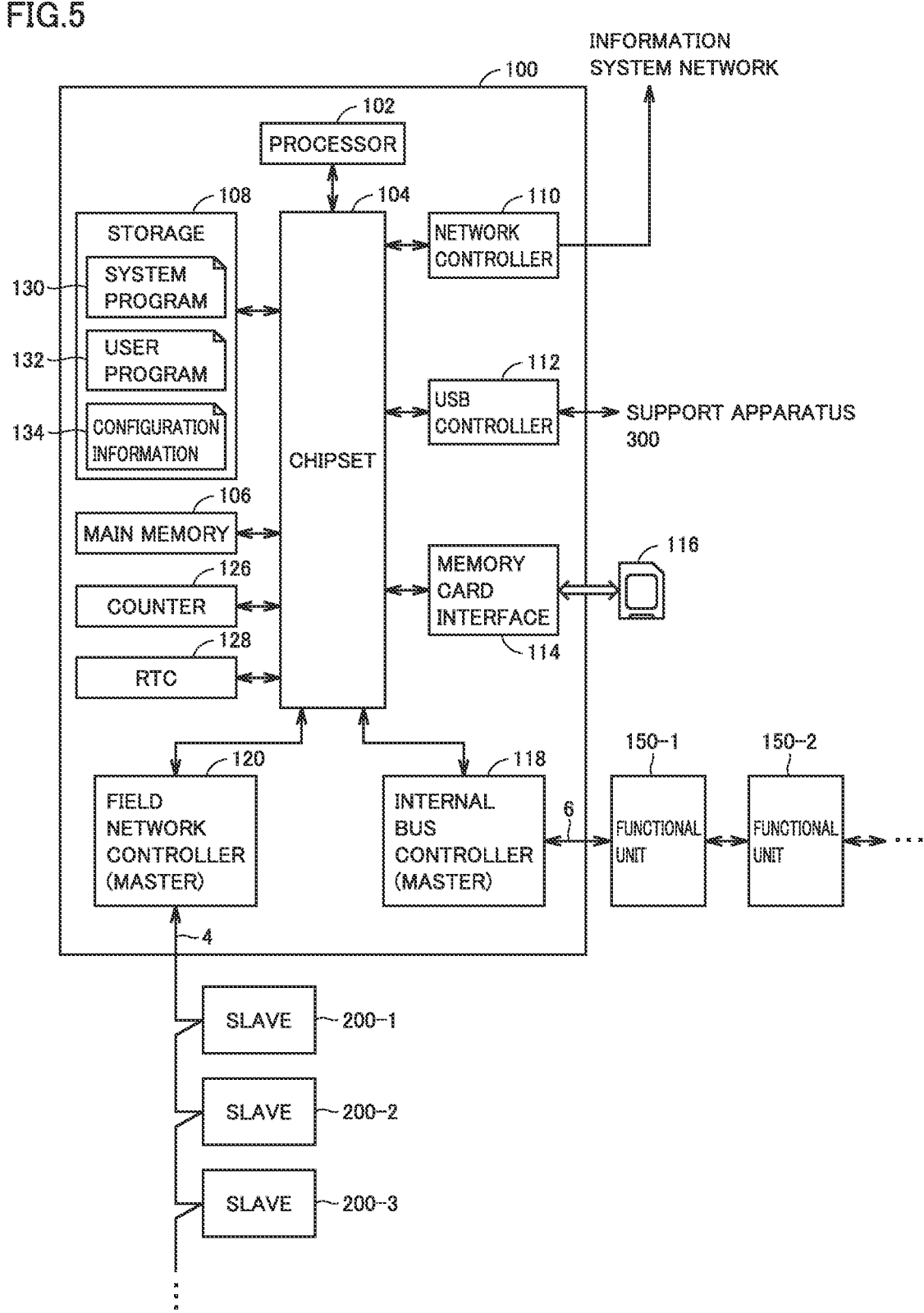
FIG. 5 is a schematic view showing an example hardware configuration of the control apparatus included in the control system according to the present embodiment.

FIG. 5 is a schematic view showing an example hardware configuration of the control apparatus 100 included in the control system according to the present embodiment. Referring to FIG. 5, the control apparatus 100 includes a processor 102, a chipset 104, a main memory 106, a storage 108, a network controller 110, a universal serial bus (USB) controller 112, a memory card interface 114, an internal bus controller 118, a field network controller 120, a counter 126, and a real time clock (RTC) 128.

The processor 102 corresponds to an arithmetic processing unit that performs control operations. The processor 102 is configured of a central processing unit (CPU) or a graphics processing unit (GPU), for example. Specifically, the processor 102 reads programs (a system program 130 and a user program 132 as one example) stored in the storage 108 and deploys the programs to the main memory 106, thereby implementing a control depending on a control object, and various processes as described below.

The main memory 106 is configured of a volatile memory, such as a dynamic random access memory (DRAM) or a static random access memory (SRAM), for example. The storage 108 is configured of a nonvolatile memory, such as a solid state drive (SSD) or a hard disk drive (HDD), for example.

The chipset 104 controls the processor 102 and each device, thereby implementing an overall process of the control apparatus 100.

In addition to the system program 130 for implementing the basic functions of the control apparatus 100, the storage 108 stores the user program 132 that is created depending on equipment or machines, etc. to be controlled.

The network controller 110 exchanges data with any information processing apparatus, such as a gateway or a database server, via an information system network. The USB controller 112 exchanges data with the support apparatus 300 via USB connection.

The memory card interface 114 is detachable from a memory card 116, and capable of writing data to the memory card 116 and reading various data from the memory card 116.

The counter 126 is used as a time base for managing the implementation timing of various programs executed at the control apparatus 100. The counter 126 may be implemented using a high precision event timer (HPET) or the like that is disposed on a system bus driving the processor 102, or implemented using a dedicated circuit, such as an application specific integrated circuit (ASIC) or a field-programmable gate array (FPGA).

The RTC 128 is a type of counter having a timing function, and provides the current time to the processor 102, etc.

The internal bus controller 118 corresponds to a communications interface for electrically connecting one or more functional units 150-1, 150-2, . . . (hereinafter, also collectively referred to as "functional unit 150") and the control apparatus 100 via an internal bus 6. The internal bus controller 118 functions as a master for performing fixed-cycle communications via the internal bus 6.

The functional unit 150 collectively refers to apparatuses that are connected to the control apparatus 100 and exchange various signals with a control object. The functional unit 150 can include an input/output (IO) unit, a communications unit, and a controller unit implementing special functions, such as PID control and motion control. The IO unit has one or more functions among, for example, a digital input (DI) function for receiving a digital input signal from a control object, a digital output (DO) function for sending a digital output signal to a control object, an analog input (AI) function for receiving an analog input signal from a control object, and an analog output (AO) function for sending an analog output signal to a control object.

The field network controller 120 corresponds to a communications interface for electrically connecting the one or more slaves 200-1, 200-2, . . . (the slave 200) and the control apparatus 100 via a network 4. As such, the field network controller 120 is a controller for connecting to multiple slaves 200, and functions as a master for performing fixed-cycle communications via the network 4.

While FIG. 5 shows the configuration example in which necessary functions are provided by the processor 102 executing the programs, some or all of these functions provided may be implemented using a dedicated hardware circuit (e.g., ASIC or FPGA, etc.). Alternatively, the primary components of the control apparatus 100 may be implemented using hardware in accordance with a general-purpose architecture (e.g., a general-purpose personal computer-based industrial personal computer). In this case, a virtualization technique may be used to execute, in parallel, multiple operating systems (OS) for different applications, and cause necessary applications to be executed on each OS.

A configuration may be employed in which the functions of a display device and the support apparatus, etc. are integrated with the control apparatus 100.

c2: Slave 200

Figure 6:
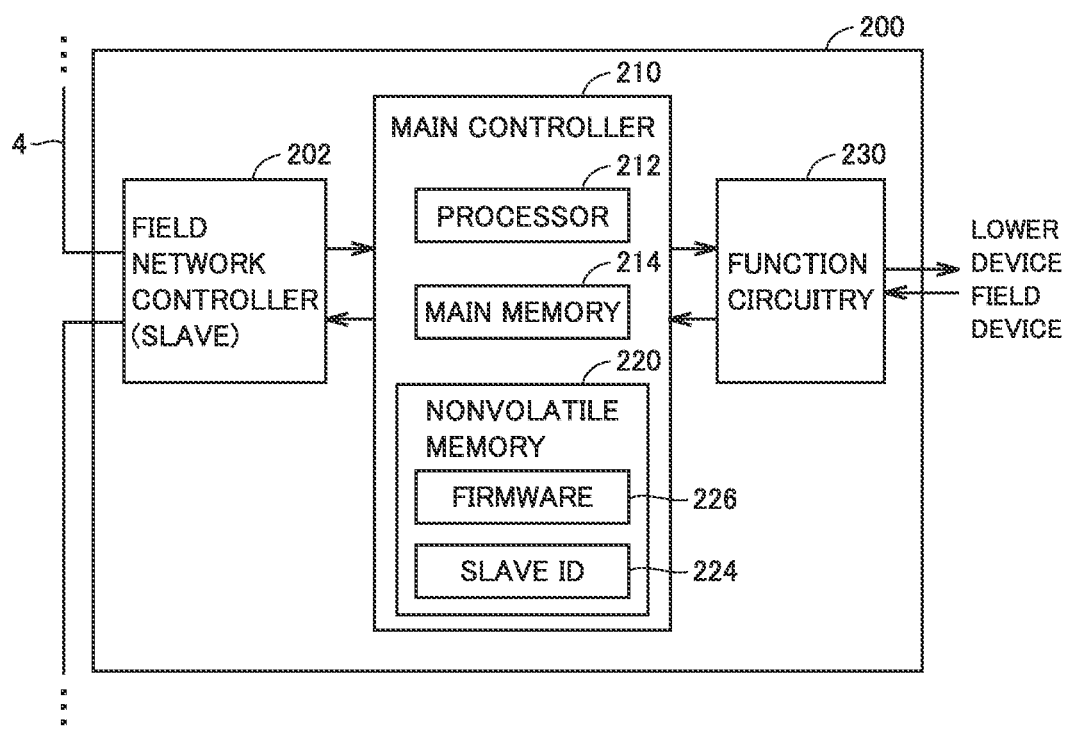
FIG. 6 is a schematic view showing an example hardware configuration of a slave included in the control system according to the present embodiment.

FIG. 6 is a schematic view showing an example hardware configuration of the slave 200 included in the control system according to the present embodiment. Referring to FIG. 6, the slave 200 includes a field network controller 202, a main controller 210, and a function circuitry 230.

The field network controller 202 corresponds to a communications interface for electrically connecting the control apparatus 100 (the master) and the slave 200 via the network 4. The field network controller 202 functions as a communication slave for performing data exchange under management of the master.

The main controller 210 is a circuit responsible for a primary control of the slave 200, and, for example, includes a processor 212, a main memory 214, and a nonvolatile memory 220.

The nonvolatile memory 220 stores firmware 226 for execution by the processor 212, and a slave ID 224.

The function circuitry 230 provides a native function of the slave 200. For example, if the slave 200 is a motor drive apparatus, the function circuitry 230 includes an inverter circuit, a control circuit, etc. If the slave 200 is a remote IO device, the function circuitry 230 includes a communications interface for exchanging data via the internal bus with a functional unit connected to the function circuitry 230.

While FIG. 6 shows the main controller 210 which includes the processor 212, some or all of the functions provided by the main controller 210 may be implemented using a dedicated hardware circuit (e.g., ASIC or FPGA, etc.).

c3: Support Apparatus 300

Figure 7:
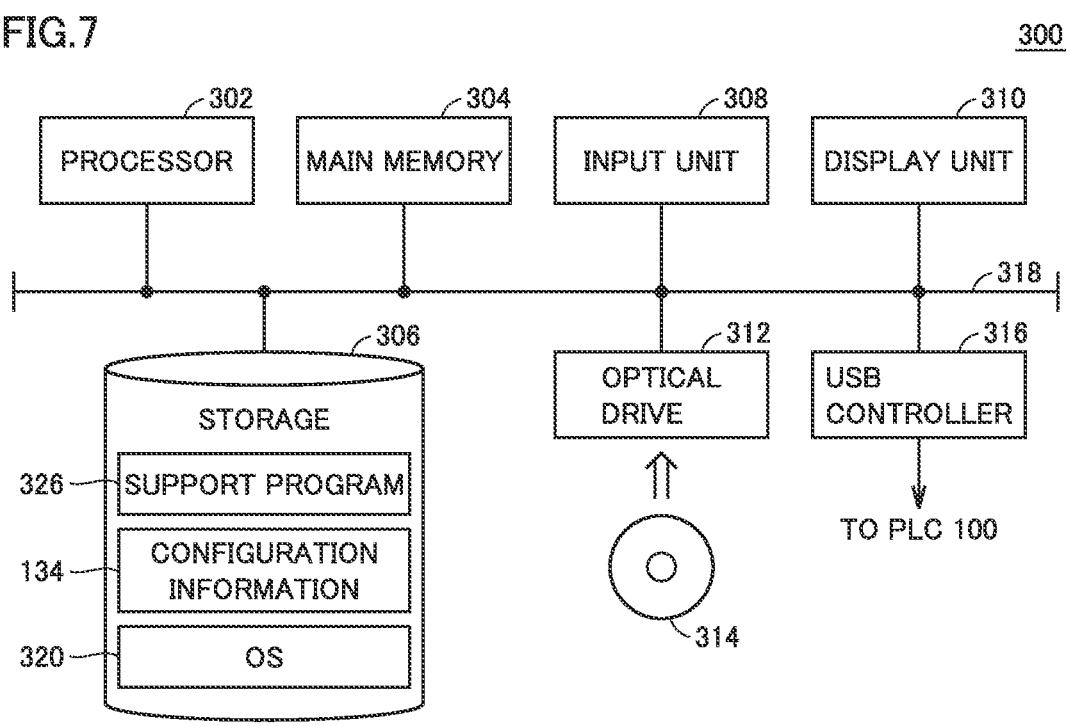
FIG. 7 is a schematic view showing an example hardware configuration of a support apparatus included in the control system according to the present embodiment.

FIG. 7 is a schematic view showing an example hardware configuration of the support apparatus 300 included in the control system according to the present embodiment. As one example, the support apparatus 300 is implemented by executing programs using hardware (e.g., a general-purpose personal computer) in accordance with a general-purpose architecture.

Referring to FIG. 7, the support apparatus 300 includes a processor 302, a main memory 304, a storage 306, an input unit 308, a display unit 310, an optical drive 312, and a USB controller 316. These components are connected together via a processor bus 318.

The processor 302 is configured of a CPU, a GPU, or the like. The processor 302 reads programs (an OS 320 and a support program 326 as one example) stored in the storage 306 and deploys the programs to the main memory 304, thereby implementing various processes as described below.

The main memory 304 is configured of a volatile memory, such as a DRAM or a SRAM, for example. The storage 306 is configured of a nonvolatile memory, such as a HDD or a SSD, for example.

In addition to the OS 320 for implementing the basic functions of the support apparatus 300, the storage 306 stores the support program 326 for providing a function as the support apparatus 300. The storage 306 further stores the configuration information 134. The way to obtain and utilize these information will be described below.

The input unit 308 is configured of a keyboard or a mouse, and receives user operations. The display unit 310 is configured of a display, various indicators, a printer, etc., and outputs a result of processing from the processor 302.

The USB controller 316 controls exchange of data with the control apparatus 100, etc., via USB connection.

The support apparatus 300 has the optical drive 312 which reads programs stored in a recording medium 314 (e.g., an optical recording medium, such as a digital versatile disc (DVD)) non-transitorily storing computer-readable programs, and the programs are installed into the storage 306, etc.

The program executed at the support apparatus 300, while it may be installed in the support apparatus 300 via the computer-readable recording medium 314, may be downloaded from, for example, a server device on the network, and installed in the support apparatus 300. The functions provided by the support apparatus 300 according to the present embodiment may also be implemented in a manner that utilizes some of the modules provided by the OS.

While FIG. 7 shows the configuration example in which the necessary functions as the support apparatus 300 are provided by the processor 302 executing the programs, some or all of these functions provided may be implemented using a dedicated hardware circuit (e.g., ASIC or FPGA, etc.).

D. Problem with Respect to Slave ID and Solution to the Problem

Next, a problem with respect to the slave ID and a solution to the problem are described.

Figure 8:
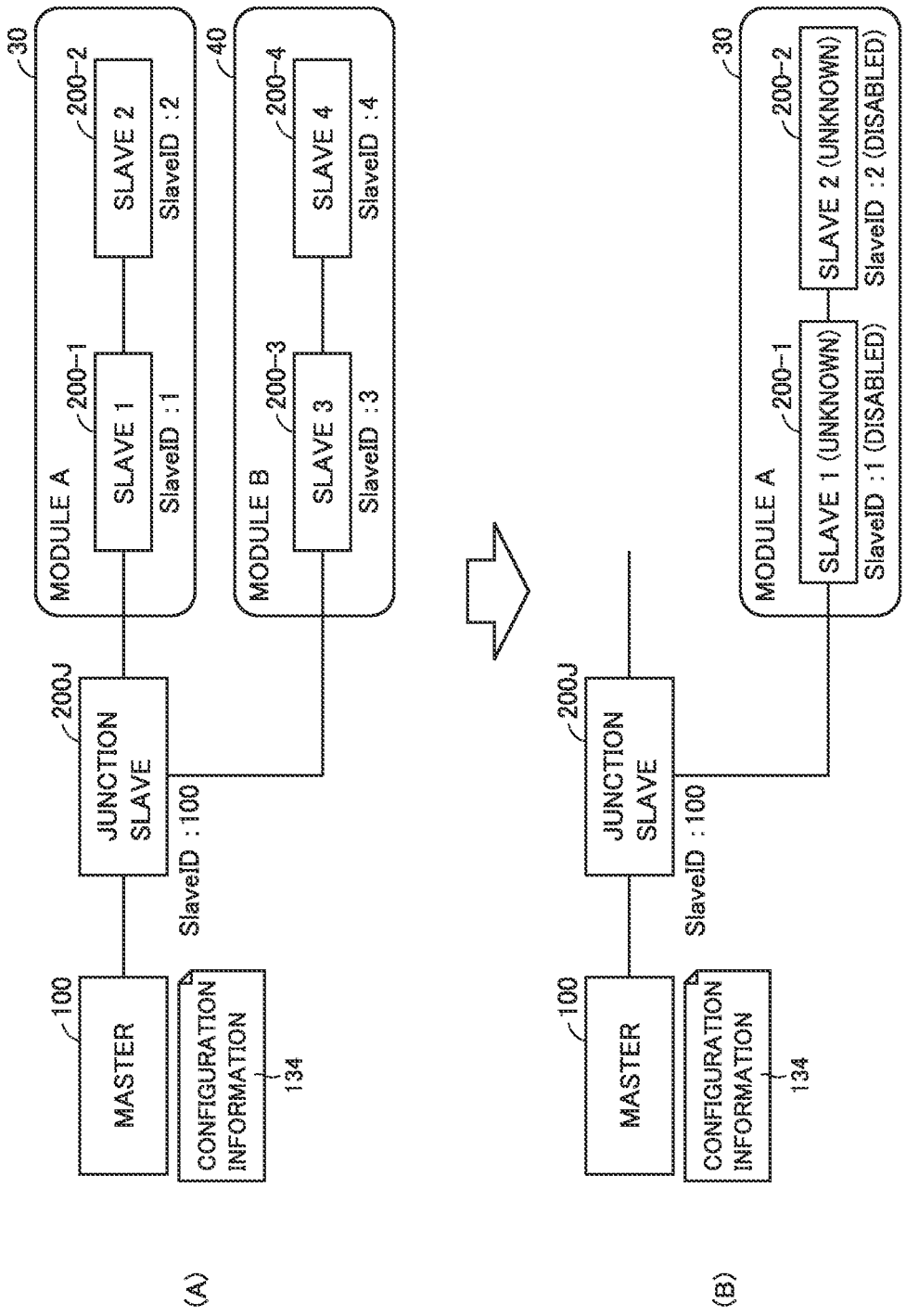
FIG. 8 is a diagram for illustrating changes in slave ID caused by a changeover.

FIG. 8 is a diagram for illustrating changes in slave ID caused by a changeover. Part (A) of FIG. 8 shows an example in which the control apparatus 100, which is the master, is connected to the manufacturing module 30 (the slaves 200-1 and 200-2) and the manufacturing module 40 (the slaves 200-3 and 200-4) via the junction slave 200J. In the connection arrangement shown in (A) of FIG. 8, the slave IDs of the slaves 200-1 and 200-2 are set to "1" and "2," respectively. The slave IDs of the slaves 200-3 and 200-4 are set to "3" and "4," respectively.

Suppose that a changeover has changed the connection arrangement from one shown in (A) of FIG. 8 to one shown in (B) of FIG. 8, at which time the manufacturing module 30 (the slaves 200-1 and 200-2) is connected to a port of the junction slave 200J different from a port to which the manufacturing module 30 was initially connected. From the perspective of the control apparatus 100, after the changeover, the setting configuration differs from the setting configuration with the connection arrangement shown in (A) of FIG. 8. In other words, the slaves 200-1 and 200-2 whose slave IDs are respectively set to "1" and "2" are now connected to locations different from the locations defined in the configuration information 134 held by the control apparatus 100 which is the master.

As a result, the slaves 200-1 and 200-2 are "unknown slaves" in the connection arrangement shown in (B) of FIG. 8.

The slave ID of such a slave that has turned to be an "unknown slave" is required to be reset or changed. However, problems as follow are contemplated in resetting or changing such a slave ID.

(1) Unable to be Referenced to by User Program 132

A slave ID that is set to the slave 200 whose actual configuration matches the configuration information 134 can be referred to in the user program 132 executed at the control apparatus 100 which is the master. In other words, the user program 132 is unable to refer to or specify a slave ID of an unknown slave. As a result, the user program 132 is unable to identify a target unknown slave, and therefore unable to reset or change the slave ID of the unknown slave.

(2) Inconvenience of Position Address

As noted above, since the user program 132 is unable to refer to or specify the slave ID of an unknown slave, the use of the position to which the unknown slave is connected (i.e., the position address) is required to identify the unknown slave.

Figure 9:
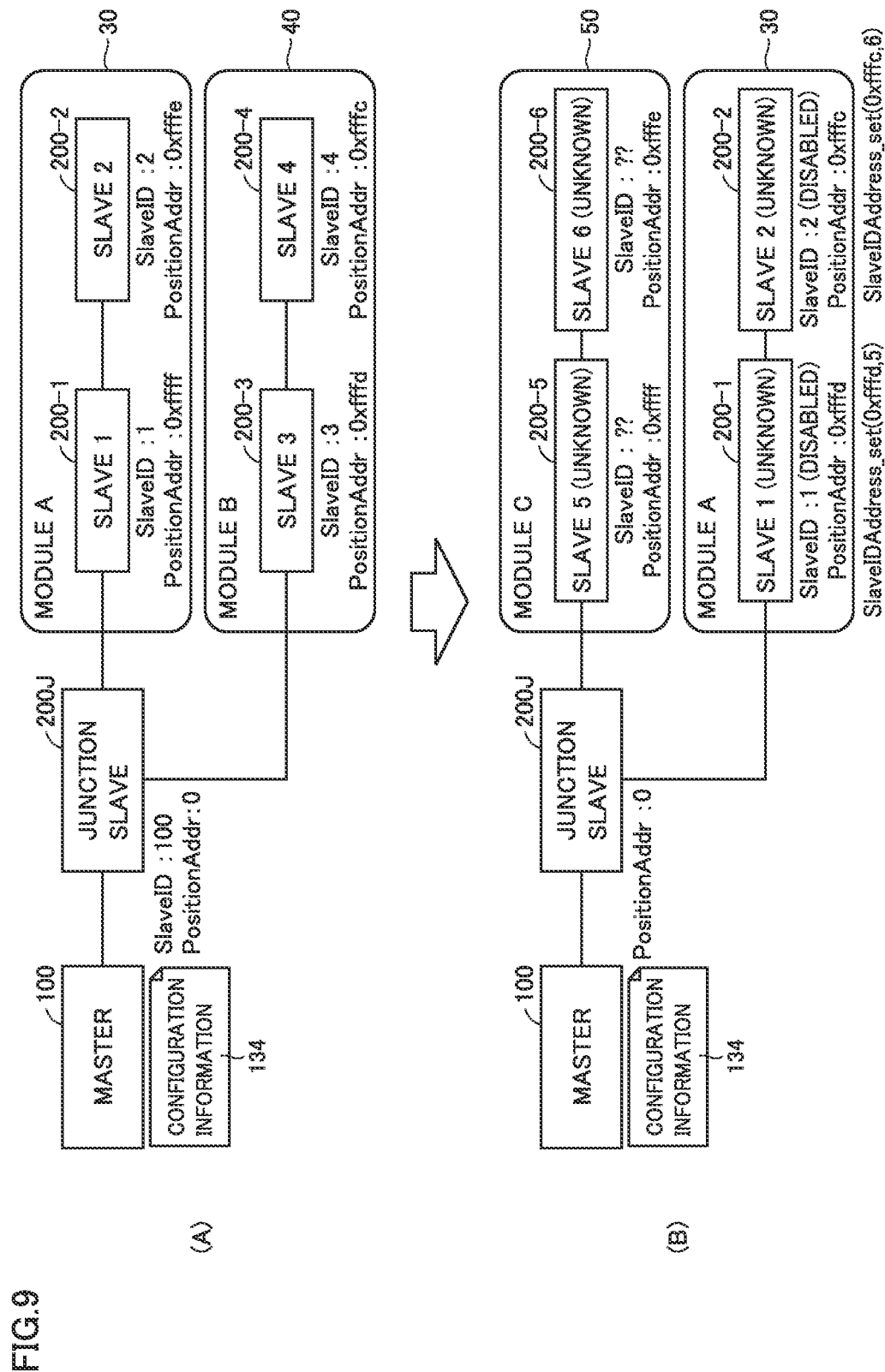
FIG. 9 is a diagram for illustrating settings of the slave ID using a position address.

FIG. 9 is a diagram for illustrating setting of a slave ID using a position address. Part (A) of FIG. 9 shows an example in which the control apparatus 100, which is the master, is connected to the manufacturing module 30 (the slaves 200-1 and 200-2) and the manufacturing module 40 (the slaves 200-3 and 200-4), via the junction slave 200J.

Suppose that a changeover has changed the connection arrangement from one shown in (A) of FIG. 9 to one shown in (B) of FIG. 9, at which time the manufacturing module 30 (the slaves 200-1 and 200-2) is connected to a port of the junction slave 200J different from a port to which the manufacturing module 30 was initially connected. Furthermore, another manufacturing module 50 (the slaves 200-5 and 200-6) is now connected to the port of the junction slave 200J to which the manufacturing module 30 (the slaves 200-1 and 200-2) was connected.

As shown in FIG. 9, as one example, the instructions as follows are available in order to set any slave ID to the slave 200 at a certain position address.

SlaveIDAddress_set ([position address of slave to be set], [slave ID to be set])

In order to execute such an instruction for setting a slave ID, an operator is required to know the position to which each slave 200 is connected to specify an appropriate position address for the slave 200. However, the operator is required to have sufficient knowledge to appropriately know such a position address. With lack of such knowledge, an unintended slave ID may be set to the slave 200.

To address the problem as described above, the present embodiment provides a method which allows any slave ID to be set to any slave 200 in an easy way, using instructions available for the user program 132.

E. Setting of Slave ID Through User Program 132

In the control apparatus 100 according to the present embodiment, an instructions (hereinafter, referred to as a "slave ID set instruction") is provided which is executable in the user program 132 and for resetting or changing a slave ID. The use of such a slave ID set instruction obviates the need for the support apparatus 300 in setting a slave ID to each slave 200. Furthermore, since the instruction is executed as a part of the user program 132, a changeover and setting of a slave ID can also be carried out in parallel, using, for example, a user operation of the display device as a trigger.

As noted above, since the user program 132 is unable to identify the slave ID of an unknown slave, the slave ID set instruction identifies the unknown slave, using, as a reference slave, a slave which is located close to the unknown slave and whose slave ID has been obtained. The slave ID set instruction then sets any slave ID to the identified unknown slave.

Figure 10:
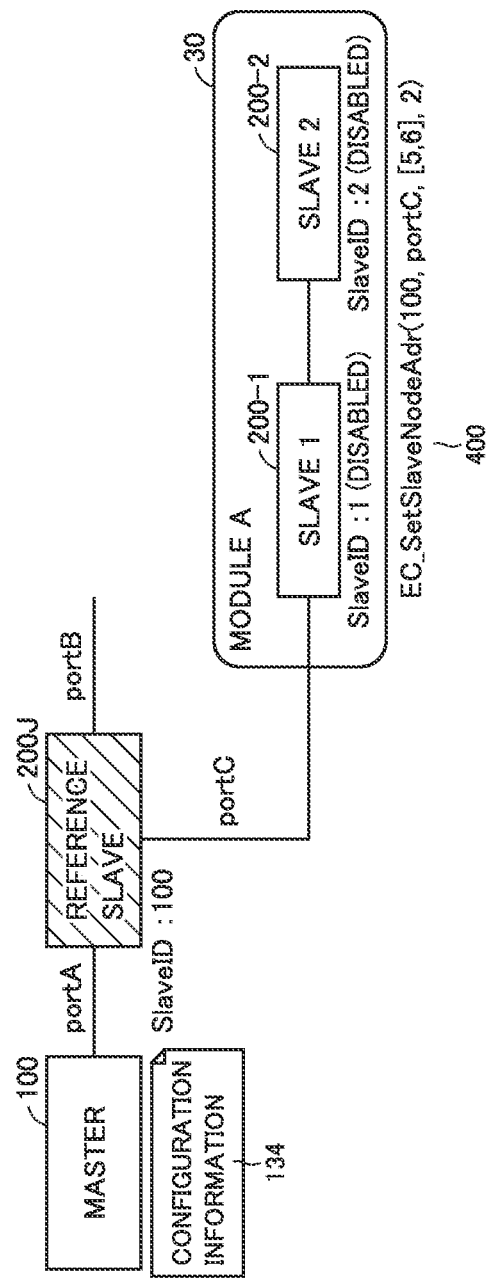
FIG. 10 is a diagram for illustrating one example of a slave ID set instruction according to the present embodiment.

FIG. 10 is a diagram for illustrating one example of the slave ID set instruction according to the present embodiment. FIG. 10 shows an example in which a slave ID is set to the manufacturing module 30 (the slaves 200-1 and 200-2) connected to a portC of the junction slave 200J.

Referring to FIG. 10, a slave ID set instruction 400 sets slave IDs to the respective slaves 200-1 and 200-2, which are unknown slaves, using, as a reference slave, the junction slave 200J that has a valid slave ID. Specifically, the slave ID set instruction 400 (EC_SetSlaveSlaveID) is specified in a format as follows:

EC_SetSlaveSlaveID ([slave ID of reference slave], [port name], [slave ID to be set], [target slave count])

In the example shown in FIG. 10, (100, portC, [5, 6], 2) is specified as parameters of the instruction EC_SetSlaveSlaveID. The first parameter, "100," indicates the slave ID of a reference slave. In the example shown in FIG. 10, the slave ID of the junction slave 200J is stored as the first parameter. The second parameter, "portC," specifies the port name of the junction slave 200J to which the slaves 200-1 and 200-2 whose slave IDs are to be respectively set are connected. The third parameter, "[5, 6]," indicates values of the slave IDs to be set to the target slaves 200-1 and 200-2, respectively. The fourth parameter, "2," indicates the number of slaves 200-1 and 200-2 whose slave ID is to be set.

In this way, the control apparatus 100 according to the present embodiment executes the slave ID set instruction 400 in which any one of slaves 200 is specified as a reference slave, thereby setting the specified slave IDs (identification information) to the specified slaves 200, respectively, other than the slave being specified as the reference slave. Such a process of setting a slave ID (identification information) using any one of slaves 200 as a reference corresponds to an identification information set function.

In order to identify a slave 200 whose slave ID is to be set, the slave ID set instruction 400 may receive designation of a port to which the slave 200 is connected (the parameter [port name] of EC_SetSlaveSlaveID). Alternatively, instead of specifying a port, any information may be used insofar as the information can identify the network that is connected to a reference slave 200.

In the control apparatus 100 according to the present embodiment, a user is not made aware of the position address of an unknown slave when setting a slave ID to the unknown slave. As a result, the user can readily create the user program 132 when the user needs to set a slave ID with a changeover, etc.

In the control apparatus 100 according to the present embodiment, the slave ID set instruction 400 can also specify multiple slave IDs to multiple slaves 200 to which the specified slave IDs are to be set, respectively. In other words, the control apparatus 100 according to the present embodiment can also set specified slaves ID (the identification information) to one or more specified slaves 200, respectively, by executing the slave ID set instruction 400.

The use of such a configuration allows multiple slave IDs to be set to multiple slaves 200, respectively, in a collective manner, which can reduce a time required to set the slave ID.

While FIG. 10 shows an example of the slave ID set instruction 400 that sets two slave IDs to two slaves 200, respectively, for purposes of explanation, it should be noted that the present invention is not limited thereto. A slave ID can be set to one slave 200, or slave IDs can be set to even more slaves 200, respectively.

While in FIG. 10, a slave that is directly connected to the manufacturing module 30 (the slaves 200-1 and 200-2), that is, directly connected to a slave 200 whose slave ID is to be set, is set as a reference slave, the present invention is not limited thereto. For example, any slave having a valid slave ID can be used as a reference slave to identify any unknown slave by means of a path (the number of paths and hops) from the reference slave, and set a slave ID to the unknown slave. Note that, preferably, a reference slave is located closer to the master than a slave 200, whose slave ID is to be set, is.

The slave ID set instruction 400 can further be specified in any representation. For example, The slave ID set instruction 400 may be specified in the form of a functional block (the details will be described later).

F. Slave ID Set Process at Slave

Next, a slave ID set process performed at the slave 200 is described.

Figure 11:
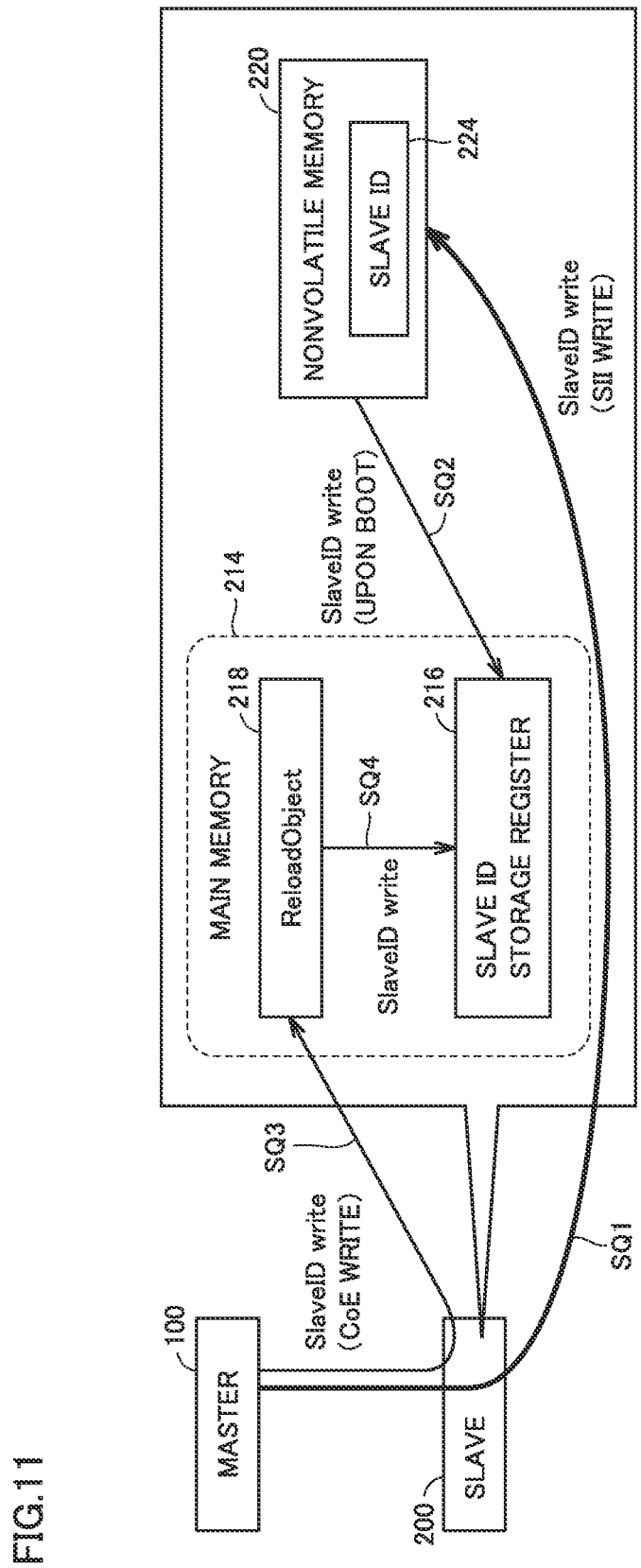
FIG. 11 is a schematic view for illustrating a slave ID set process performed at a slave included in the control system according to the present embodiment.

FIG. 11 is a schematic view for illustrating the slave ID set process that is performed at a slave 200 included in the control system according to the present embodiment. Referring to FIG. 11, the slave 200 has the slave ID 224 stored in the nonvolatile memory 220. A slave ID storage register 216 is available on the main memory 214 during the operation of the slave 200. A slave ID is also written to the slave ID storage register 216.

As shown in FIG. 11, the slave 200 has the nonvolatile memory 220 for holding a slave ID (the identification information), and the main memory 214 which is a volatile memory holding a slave ID (the identification information) set to the slave 200.

In the present embodiment, two types of method of writing of a slave ID to the slave ID storage register 216 are available.

The first method is a method of the master writing the content of the nonvolatile memory 220 of the slave 200. The nonvolatile memory 220 has a region that can be externally accessed, and the slave ID 224 is stored in that region. Note that the nonvolatile memory 220 may be implemented in an EEPROM. The master accesses and writes a slave ID to the nonvolatile memory 220 (sequence SQ1). The write is, since it is performed using a slave information interface (SII), also referred to as a "SII write." In other words, in the slave ID set process, the control apparatus 100 writes a specified slave ID to the nonvolatile memory 220 of a specified slave 200, using SII.

However, the slave ID written to the nonvolatile memory 220 is not reflected as is to the slave ID storage register 216. The slave ID stored in the nonvolatile memory 220 is read upon a reboot of the slave 200, and then reflected to the slave ID storage register 216 (sequence SQ2). For this reason, if a slave ID is written to the nonvolatile memory 220 of a slave 200 whose slave ID is to be set, the slave 200 is required to be rebooted.

The second method employs a slave identification reload object 218. The slave identification reload object 218 is an object that is specified as a service data object (SDO) in EtherCAT, and can be processed in response to an external access. The slave identification reload object 218 is instantiated on the main memory 214, and can reload the slave ID stored in the slave ID storage register 216, in accordance with an external command. The write is, since it is performed using a CoE (CANopen over EtherCAT) protocol, also referred to as a "CoE write."

In other words, the control apparatus 100 uses the CoE protocol to write a specified slave ID to the main memory 214 (the volatile memory) of a specified slave 200 in the slave ID set process.

In the second method, as the master writes to the slave identification reload object 218 a slave ID to be set (sequence SQ2), the slave identification reload object 218 reloads the value stored in the slave ID storage register 216 (sequence SQ3).

In this way, when a specified slave ID (the identification information) is written to the main memory 214 (the volatile memory) of the slave 200 in which the slave identification reload object 218 is implemented, the slave identification reload object 218 reloads the value of the slave ID stored in the main memory 214.

According to the method employing the slave identification reload object 218, there is no need to interrupt the power supply of the slave 200 and reboot the slave 200 to reflect the slave ID. However, the slave identification reload object 218 is required to be implemented in the slave 200 whose slave ID is to be set. Conversely, in order to reflect a slave ID that is set to a slave 200 in which no slave identification reload object 218 is implemented, the interruption of the power supply of the slave 200 and a reboot of the slave 200 are required.

As described below, as the slave ID set instruction 400 according to the present embodiment is executed, a slave ID is set to a slave 200 by both the first and second method. In other words, in the slave ID set process, the control apparatus 100 writes a specified slave ID to both the nonvolatile memory 220 and the main memory 214 (a volatile memory) of the target slave 200, at which time the control apparatus 100 outputs information (such as "ShouldReboot 415" shown in FIG. 12 described below) indicating whether a reboot of the specified slave 200 is required, in response to whether the writing of the specified slave ID to the specified slave 200 is successful or not.

However, only one of the first and second methods may be performed. Alternatively, the second method may be performed, and the first method may be performed only if the performance of the second method is failed (typically, if the slave identification reload object 218 is not implemented in the target slave 200).

G. Example Description of Instructions

While the slave ID set instruction 400 according to the present embodiment and associated instructions can be specified in any form, they may be specified in the form of a functional block, for example.

FIG. 12 is a diagram for illustrating the slave ID set instruction 400 as a functional block which is available for the user program 132 for the control apparatus 100 according to the present embodiment. Referring to FIG. 12, the slave ID set instruction 400 as the functional block includes Execute 401, PreviousSlaveID 402, PreviousSlavePort 403, NewSlaveIDTable 404, NumOfSlaves 405, and FailureTable 406 as inputs.

A boolean variable, which is a condition for executing the slave ID set instruction 400, is specified in Execute 401. A slave ID of a reference slave is specified in PreviousSlaveID 402. A port name of the reference slave is specified in PreviousSlavePort 403. One or more slaves ID to be set are specified in NewSlaveIDTable 404. A number of slaves to which slave IDs are to be respectively set is specified in NumOfSlaves 405. FailureTable 406 specifies a table name storing slaves that the setting of respective slave IDs to which is failed.

The slave ID set instruction 400 as the functional block also includes Done 411, Busy 412, Error 413, ErrorID 414, ShouldReboot 415, and FailureTable 416 as outputs.

Done 411 outputs a boolean value indicating whether the slave ID set instruction 400 is normally terminated. Busy 412 outputs a boolean value indicating whether the slave ID set instruction 400 is in process. Error 413 outputs a boolean value indicating whether the slave ID set instruction 400 is abnormally terminated. ErrorID 414 outputs an error value upon abnormal termination of the slave ID set instruction 400. ShouldReboot 415 outputs a boolean value indicating whether a reboot of a slave whose slave ID is to be set, is required. FailureTable 416 outputs an array of slaves that the setting of slave IDs to which, respectively, is failed. As such, the slave ID set instruction 400 is to receive a table name to which the error information is to be output, the error information indicating which slave the setting of a slave ID to which is failed.

PreviousSlaveID 402, PreviousSlavePort 403, NewSlaveIDTable 404, and NumOfSlaves 405, shown in FIG. 12, each correspond to a parameter for setting, to one or more unknown slaves, respective slave IDs, with any slave being set as a reference slave, as described with reference to FIG. 10.

FailureTables 406 and 416, shown in FIG. 12, store information indicating whether a slave ID is successfully set to an unknown slave.

The value output as ShouldReboot 415 shown in FIG. 12 corresponds to the information indicating, when a slave ID is set to a slave in which no slave identification reload object 218 is implemented, that a reboot of the slave needs is required, as described with reference to FIG. 11.

As an application using the above-described reference slave, an instruction (hereinafter, referred to as a "slave ID read instruction") may be provided which obtains the slave ID of an unknown slave, rather than setting a slave ID to an unknown slave.

FIG. 13 is a diagram for illustrating a slave ID read instruction 420 as a functional block which is available for the user program 132 included in the control apparatus 100 according to the present embodiment. Referring to FIG. 13, the slave ID read instruction 420 as the functional block includes Execute 421, PreviousSlaveID 422, PreviousSlavePort 423, and NumOfSlaves 424 as inputs.

A boolean variable, which is a condition for executing the slave ID read instruction 420, is specified in Execute 421. The slave ID of a reference slave is specified in Previous- SlaveID 422. A port name of the reference slave is specified in PreviousSlavePort 423. A number of slaves whose respective slave IDs are to be read is specified in NumOfSlaves 424.

The slave ID read instruction 420 as the functional block also includes Done 431, Busy 432, Error 433, ErrorID 434, GetSlaveIDTable 435, and IsSlaveIDTable 436 as outputs.

Done 431 outputs a boolean value indicating whether the slave ID read instruction 420 is normally terminated. Busy 432 outputs a boolean value indicating whether the slave ID read instruction 420 is in process. Error 433 outputs a boolean value indicating whether the slave ID read instruction 420 is abnormally terminated. ErrorID 434 outputs an error value upon abnormal termination of the slave ID read instruction 420. GetSlaveIDTable 435 outputs an array of slave IDs read from the respective slaves. IsSlaveIDTable 436 outputs an array of boolean values indicating whether the slave ID are successfully obtained.

In this way, the control apparatus 100 according to the present embodiment executes the slave ID read instruction 420 specifying one of slaves 200 as a reference slave, thereby reading the slave IDs (the identification information) set to other specified slaves 200, respectively. Such a process of reading the slave IDs (the identification information) using any one of slaves 200 as a reference slave corresponds to an identification information read function.

The slave ID set instruction 400 and the slave ID read instruction 420 as described above may be executed as a part of the user program 132 executed at the control apparatus 100. In other words, the user program 132 can include a code designating the execution of the slave ID set instruction 400 or the slave ID read instruction 420.

H. Procedure

A procedure is described which is performed when the slave ID set instruction 400 according to the present embodiment is executed from the user program 132.

Figure 14:
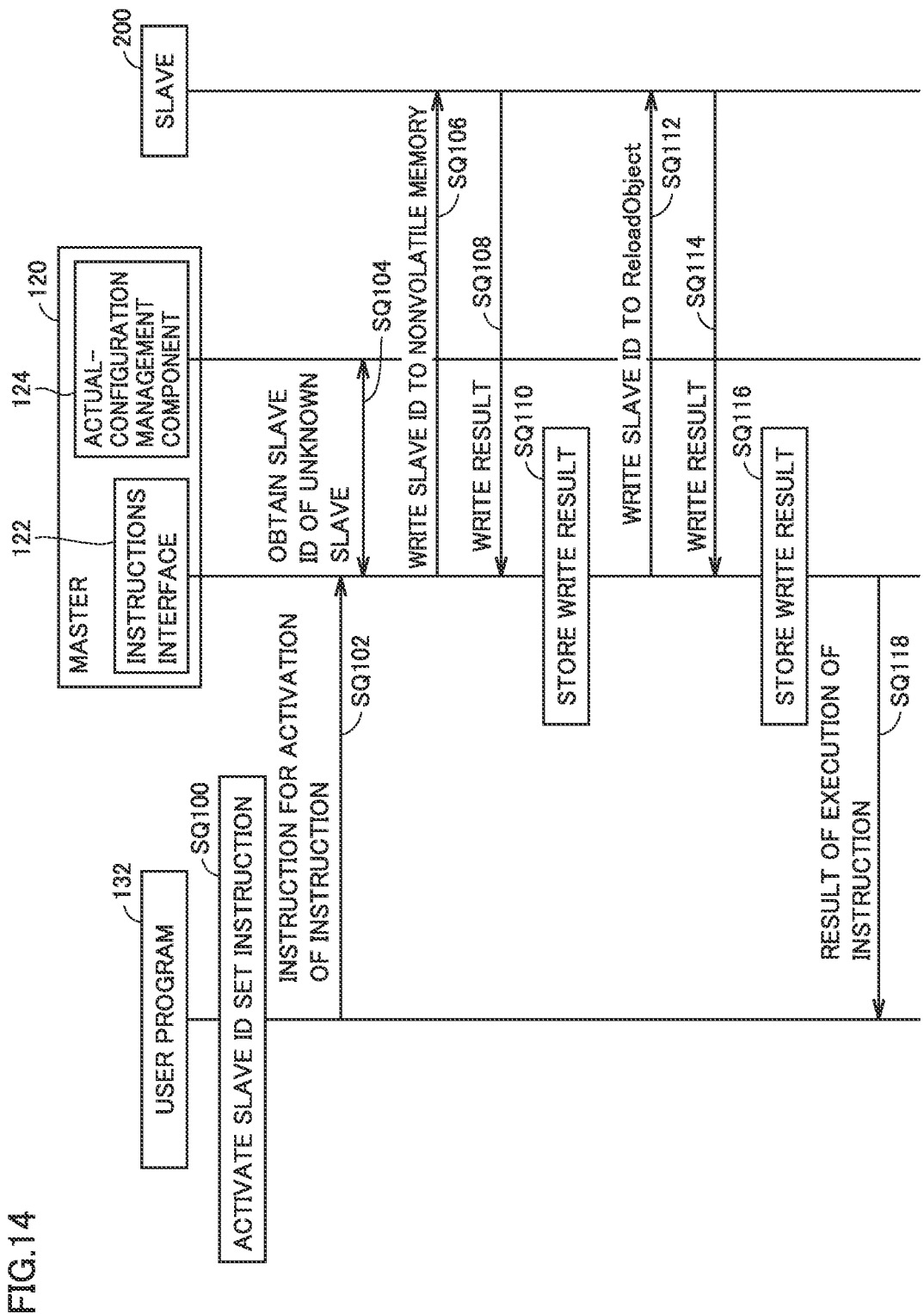
FIG. 14 is a sequence diagram showing a procedure performed when the slave ID set instruction according to the present embodiment is executed from the user program.

FIG. 14 is a sequence diagram showing a procedure performed when the slave ID set instruction 400 according to the present embodiment is executed from the user program 132. The procedure, shown in FIG. 14, involves the user program 132 executed by the processor 102 included in the control apparatus 100, the field network controller 120 providing functions of the control apparatus 100 as the master, and the slave 200.

The field network controller 120 has an instructions interface 122 which receives instructions from the user program 132, and an actual-configuration management component 124 which manages the actual connection condition (hereafter, also referred to as "actual-configuration information") of a slave 200 connected to the network 4. The position, to which the slave 200 is connected whose slave ID is to be set by the execution of the slave ID set instruction 400, is identified by referring to connection conditions (the actual-configuration information) of multiple slaves 200.

More specifically, during the course of cyclic execution of the user program 132, as the slave ID set instruction 400 is activated (sequence SQ100), an instruction activation instruction is provided to the instructions interface 122 of the field network controller 120 (sequence SQ102). The instruction activation instruction includes input information to be set to the slave ID set instruction 400 shown in FIG. 12.

The instructions interface 122 refers to the actual-configuration information managed by the actual-configuration management component 124, and obtains the slave ID of an unknown slave whose slave ID is to be set, based on the slave ID and the port name of the specified reference slave (sequence SQ104).

Subsequently, the instructions interface 122 identifies the slave 200 whose slave ID is to be set, based on the slave ID obtained in the sequence SQ104, and then writes the specified slave ID to the nonvolatile memory 220 of the identified slave 200 (sequence SQ106). The instructions interface 122 further obtains a result of the writing of the slave ID to the nonvolatile memory 220 (a write result) (sequence SQ108), and stores the write result therein (sequence SQ110).

Subsequently, the instructions interface 122 identifies the slave 200 whose slave ID is to be set, based on the slave ID obtained in the sequence SQ104, and then writes the specified slave ID to the slave identification reload object 218 of the slave 200 (sequence SQ112). The instructions interface 122 further obtains a result of the writing of the slave ID to the slave identification reload object 218 (a write result) (sequence SQ114), and stores the write result therein (sequence SQ116).

Note that if multiple slaves 200 are specified as those to which slave IDs are to be respectively set, the processes from the sequence SQ104 to the sequence SQ116 are repeated for the number of the target slaves 200.

Last, the instructions interface 122 returns a result of execution of the instruction to the user program 132 (sequence SQ118).

The result of execution of the instruction returned to the user program 132 includes a boolean value indicating whether a reboot of the slave, whose slave ID is to be set, is required (ShouldReboot 415). Specifically, if the specified slave ID is successfully written to the slave identification reload object 218, irrespective of whether the specified slave ID is successfully written to the nonvolatile memory 220 (sequence SQ106), a value is returned to the user program 132, indicating that there is no need to reboot the slave whose slave ID is to be set. In contrast, if the specified slave ID is successfully written to the nonvolatile memory 220 (sequence SQ106) while the writing of the specified slave ID to the slave identification reload object 218 (sequence SQ112) is failed, a value is returned to the user program 132, indicating that it is required to reboot the slave whose slave ID is to be set.

In this way, in the slave ID set process, if the specified slave ID is successfully written to the nonvolatile memory 220 of the specified slave 200 while the writing of the specified slave ID to the main memory 214 (the volatile memory) is failed, the control apparatus 100 outputs the information indicating that a reboot of the specified slave is required.

Note that if the writing of the specified slave ID to the nonvolatile memory 220 (sequence SQ106) and the writing of the specified slave ID to the slave identification reload object 218 (sequence SQ112) are both failed, information may be output, indicating that the slave ID set instruction 400 is abnormally terminated.

Figure 15:
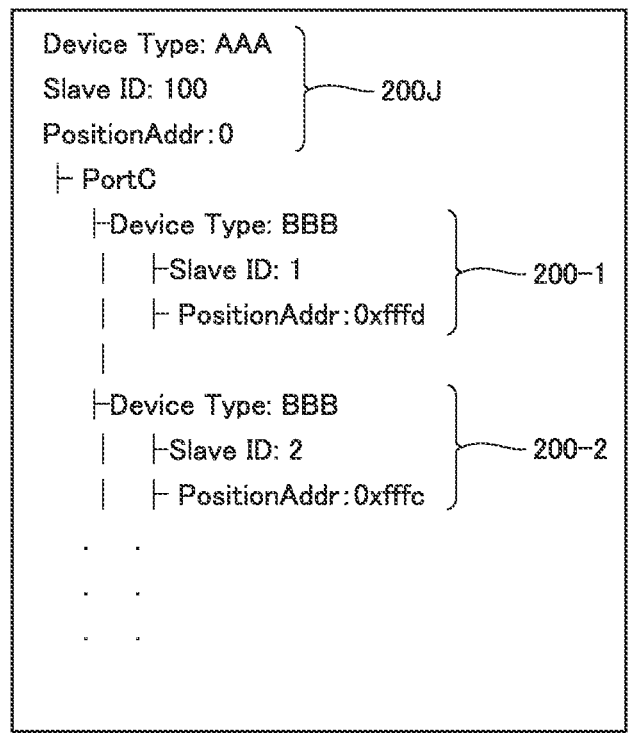
FIG. 15 is a schematic view showing one example of actual-configuration information held by an actual-configuration management component shown in FIG. 14.

FIG. 15 is a schematic view showing one example of the actual-configuration information held by the actual-configuration management component 124 shown in FIG. 14. As one example, FIG. 15 shows the actual-configuration information corresponding to the connection arrangement shown in FIG. 10.

Referring to FIG. 15, the actual-configuration management component 124 includes the device information of the junction slave 200J located closest to the control apparatus 100 functioning as the master, and the device information of the slaves 200-1 and 200-2 connected to respective ports of the junction slave 200J. These information are managed in a manner that the connections between the junction slave 200J and the slaves 200-1 and 200-2 are reflected thereto.

The actual-configuration management component 124 refers to the actual-configuration information, thereby identifying the slaves 200-1 and 200-2 that are connected to portC of the junction slave 200J.

Note that the information embodied in FIG. 15 is for purposes of explanation, and may be managed in any form.

I. Analysis Assistance Function in Event of Abnormality

The slave ID set instruction 400 and the slave ID read instruction 420 that are available for the user program 132 of the control apparatus 100 according to the present embodiment set or read respective slave IDs of one or more slaves. If one wishes to execute the process for multiple slaves and an execution failure (the abnormal termination) occurs at any of the slaves, it is not easy to determine in which slave the abnormality has occurred and its cause. Thus, the present embodiment provides an analysis assistance function in the event of failure as follows.

Figure 16:
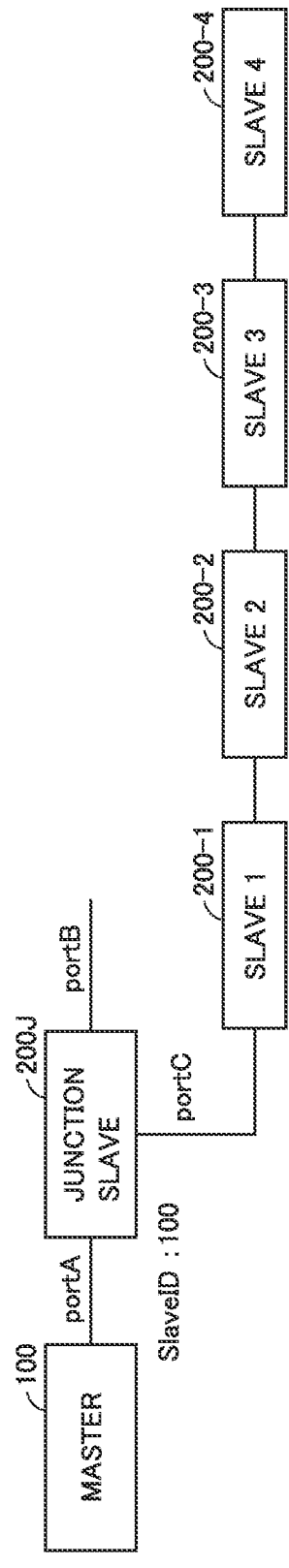
FIG. 16 is a schematic view showing one example of an abnormal termination result output from the slave ID set instruction according to the present embodiment.

FIG. 16 is a schematic view showing one example of an abnormal termination result output from the slave ID set instruction 400 according to the present embodiment. As one example, FIG. 16 shows an example in which four slave IDs are set to four slaves 200-1 to 200-4, respectively, connected to the junction slave 200J.

In this case, FailureTable 416 output from the slave ID set instruction 400 includes four boolean values indicating whether a slave ID is successfully set to each slave 200. For example, if four slave IDs are set to four slaves 200-1 to 200-4, respectively, without an abnormality, an array [0, 0, 0, 0] is output.

In contrast, if the setting of a slave ID to the slave 200-2 that is second closest to the junction slave 200J fails, FailureTable 416 is output in which the value at the position corresponding to the second closest slave 200-2 has been changed to "1." In other words, an array [0, 1, 0, 0] is output as FailureTable 416.

In this way, the control apparatus 100 outputs the information identifying the slave 200 that the setting of a slave ID to which has failed in the slave ID set process. More specifically, the control apparatus 100 outputs error information (FailureTable 416) indicating which slave that the setting a slave ID to which is failed in the slave ID set process among the one or more specified slaves 200. FailureTable 416, output as the error information, stores an array of members corresponding to the one or more specified slaves 200.

In this way, the slave ID set instruction 400, executed by the control apparatus 100, outputs an abnormal termination result associated with the position of a slave relative to a reference slave, and thus can readily identify the position of the slave in which an abnormality has occurred. In other words, in order to identify a cause of failure in setting or reading a slave ID, the information indicating the position of the slave 200 that the setting or reading of a slave ID to which is failed is output from the slave ID set instruction 400.

The slave ID set instruction 400 may further output Error 413 (FIG. 12) indicating whether the setting of slave IDs to the one or more specified slaves 200, respectively, has failed. For example, a process may be implemented in which FailureTable 416 is referred to when Error 413 has a value indicating that the setting of a slave ID is failed.

An error code may be further output, indicating a reason for the failure in setting or reading of a slave ID. Typically, the slave ID set instruction 400 as a functional block can output the reason as ErrorID 414 (see FIG. 12). In other words, the slave ID set instruction 400 may further output ErrorID 414 (see FIG. 12) indicating a reason for the failure in setting of slave IDs to the one or more specified slaves 200, respectively, has failed. Note that if multiple slave IDs are to be set to multiple slaves 200, respectively, the slave ID set instruction 400 may output an error code for each slave 200. If multiple error codes are generated, the slave ID set instruction 400 may output the error codes in the order starting from an error code with a highest priority.

Note that the slave ID set instruction 400 as a functional block may output the information indicating whether a slave ID is successfully set, as Error 413.

In this way, according to the slave ID set instruction and the slave ID read instruction of the present embodiment, the information indicating whether the instructions are successfully executed or not (successful/failed) can be obtained, and an error code indicating a reason for the failure can be obtained too. Furthermore, according to the slave ID set instruction and the slave ID read instruction of the present embodiment, the position of a slave that the setting of a slave ID to which is failed can also be identified. When the setting of a slave ID to a slave fails, the use of these information allows readily identification of the target slave and its cause.

The control apparatus 100 according to the present embodiment may further store the content of a command (packet) transmitted to a target slave when setting or reading the slave ID from the slave, and output the content of the stored command (packet) in the event of a failure of any of the processes.

The control apparatus 100 according to the present embodiment may further store a log associated with the processes of setting or reading of slave IDs, and output the content of the log in the event of a failure of any of the processes.

J. Example User Program

Next, some example user programs using the slave ID set instruction 400 according to the present embodiment are described.

j1: Changeover

Initially, the user program 132 for a changeover using the slave ID set instruction 400 is described.

FIG. 17 is a diagram for illustrating the content of a changeover using the slave ID set instruction 400 according to the present embodiment. Assume that the connection arrangement is changed from one shown in (A) of FIG. 17 to one shown in (B) of FIG. 17. More specifically, assume that four slaves 200-1, 200-2, 200-3, and 200-4 are disconnected from a port X4 of the junction slave 200J, and reconnected to a port X5 of the junction slave 200J.

Figure 18:
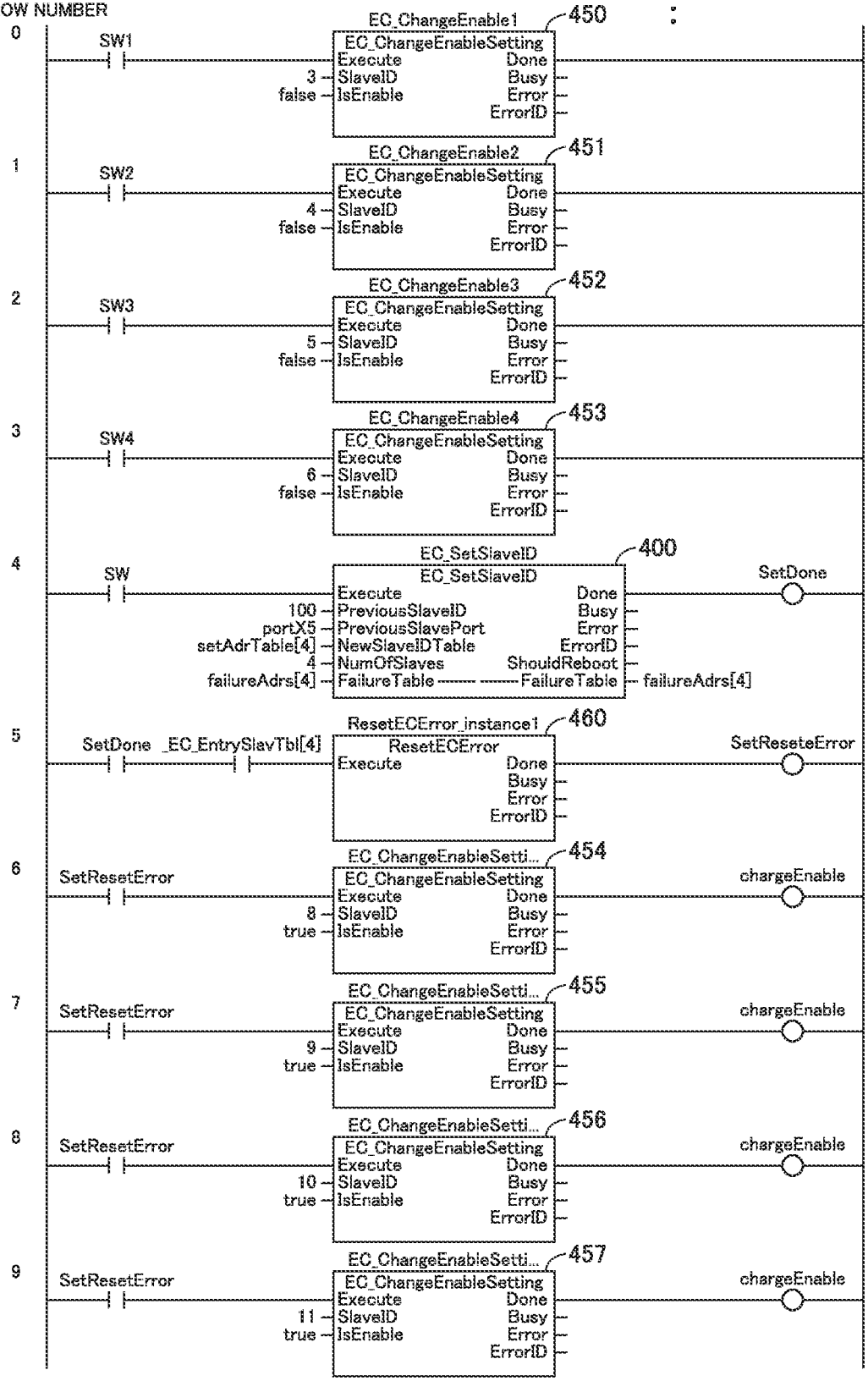
FIG. 18 is a diagram showing an essential part of the user program corresponding to the changeover shown in FIG. 17.

FIG. 18 is a diagram showing an essential part of the user program 132 corresponding to the changeover shown in FIG. 17. Referring to FIG. 18, the user program 132 includes seven lines of codes having row numbers 0 to 6.

An instruction EC ChangeEnableSetting included in the user program 132 switches the slave between enabled and disabled. The slave enabled/disabled switch instructions 450, 451, 452, and 453 described on the row numbers 0, 1, 2, and 3 enable target slaves, and the slave enabled/disabled switch instructions 454, 455, 456, and 457 described on the row numbers 6, 7, 8, and 9 disable the target slaves. The control apparatus 100 executes these instructions for disabling the target slaves, thereby disabling some or all the slaves included in the definition by the configuration information 134.

An instruction ResetECError resets an error of the slave. A slave error reset instruction 460 described on the row number 5 corresponds to the instruction ResetECError.

FIG. 19 is a diagram for illustrating changes in connection condition corresponding to the changeover shown in FIG. 17. FIG. 20 is a diagram for illustrating changes in configuration information 134 corresponding to the changeover shown in FIG. 17.

The changeover shown in FIG. 17 is performed in accordance with the following steps 1 to 7. Note that "#" is appended to each number, meaning that the number is a value of a slave ID.

Step 1

In the aspect of prior preparation, four slaves 200-1, 200-2, 200-3, and 200-4 are connected to the port X4 of the junction slave 200J, as shown in (A) of FIG. 19. The support apparatus 300 then sets slave IDs "3," "4," "5," and "6" to the slaves 200-1, 200-2, 200-3, and 200-4, respectively.

The support apparatus 300 also transfers the configuration information 134 shown in (A) of FIG. 20 to the control apparatus 100 functioning as the master, at which time the slaves #3 to #10 are all set "Disabled."

Step 2

In the aspect of start of operation, the control apparatus 100, the junction slave 200J, and the slaves 200-1, 200-2, 200-3, and 200-4 are powered on. Collectively, the slave enabled/disabled switch instruction (not shown in FIG. 18) included in the user program 132 are executed, thereby enabling the slaves #3 to #6 in the configuration information 134 (see (B) of FIG. 20). This initiates the operation of the control apparatus 100 with the connection arrangement shown in (A) of FIG. 17.

Step 3

Subsequently, suppose that a changeover is initiated. Initially, the slave enabled/disabled switch instructions 450, 451, 452, and 453 (see FIG. 18) are executed, thereby disabling the slaves #3 to #6 in the configuration information 134. In other words, the configuration information 134 returns to the state shown in (A) of FIG. 20.

Step 4

Subsequently, the power supply for the slaves 200-1, 200-2, 200-3, and 200-4 is interrupted as shown in (B) of FIG. 19, and the slaves 200-1, 200-2, 200-3, and 200-4 are then detached from the port X4 of the junction slave 200J.

(Step 5) Subsequently, four slaves 200-1, 200-2, 200-3, and 200-4 are connected to the port X5 of the junction slave 200J, as shown in (C) of FIG. 19. The power supply for the slaves 200-1, 200-2, 200-3, and 200-4 are then cycled.

At this time, the content of the configuration information 134 managed by the control apparatus 100 does not match the actual configuration. Thus, a "network configuration match error (slave mismatch)" occurs.

Step 6

In order to initiate the operation of the control apparatus 100 with the connection condition shown in (C) of FIG. 19, the slave ID set instruction 400 is executed (the fourth line of the user program 132 shown in FIG. 18). The slave ID set instruction 400 uses the junction slave 200J as a reference slave to identify the slaves 200-1, 200-2, 200-3, and 200-4 connected to a port X4 as target slaves, and then sets the slave IDs "7," "8," "9," "10" to the slaves 200-1, 200-2, 200-3, and 200-4, respectively.

Step 7

Then, in order to reset the "network configuration match error (slave mismatch)," the slave error reset instruction 460 is executed (the fifth line of the user program 132 shown in FIG. 18). The slave enabled/disabled switch instructions 454, 455, 456, and 457 are further executed (the sixth to ninth lines of the user program 132 shown in FIG. 18), thereby enabling the slaves #7 to #10 in the configuration information 134 (see (C) of FIG. 20). This initiates the operation of the control apparatus 100 with the connection arrangement shown in (B) of FIG. 17.

As described above, a changeover can be implement using the user program 132 by providing the slave ID set instruction 400 according to the present embodiment and associated instructions.

j2: Reboot

As noted above, if a slave ID is set to a slave 200 in which no slave identification reload object 218 is implemented, a reboot of the slave 200 (interruption and cycling of the power supply) is required. The user program 132 can be created so as to prompt an operator to reboot such a slave 200.

Figure 21:
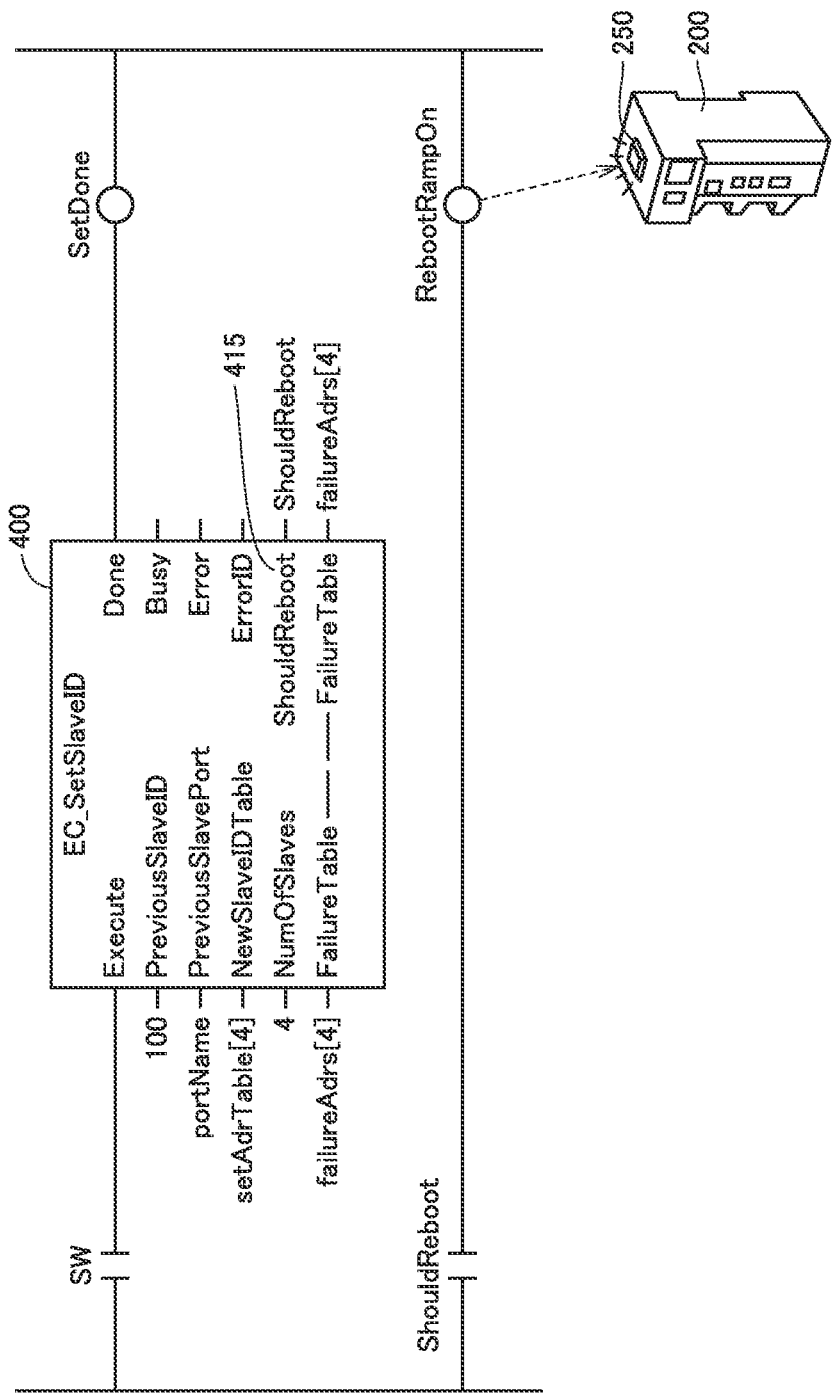
FIG. 21 is a diagram illustrating one example of a user program for prompting for a reboot of a slave, using the slave ID set instruction according to the present embodiment.

FIG. 21 is a diagram illustrating one example of the user program 132 for prompting for a reboot of the slave 200, using the slave ID set instruction 400 according to the present embodiment. The user program 132 shown in FIG. 21 outputs the value of ShouldReboot 415 from the slave ID set instruction 400 in a variable (a boolean value) "ShouldReboot." "ShouldReboot" determines a value (a boolean value) of a variable "RebootRampOn." In other words, as the variable "ShouldReboot" is set "true," the variable "RebootRampOn" are also set "true."

When a slave 200, whose slave ID is to be set, needs to be rebooted, an operator can be presented so by the variable "RebootRampOn" being associated with a command for driving an indicator 250 provided on the slave 200.

In this way, since an operator is presented with information indicating whether a reboot of each slave 200 is required, a changeover with safety concern can be achieved. Furthermore, if multiple slaves 200 are present, the order in which the slaves 200 are rebooted (cycling of the power supply) can also be presented to an operator.

j3: Abnormality Detection

As noted above, if any of the setting of multiple slave IDs to multiple slaves 200, respectively, has failed, the slave ID set instruction 400 according to the present embodiment outputs the information which allows identification of the failed slave 200. The user program 132 can also be created for presenting such position-identifiable information to an operator.

Figure 22:
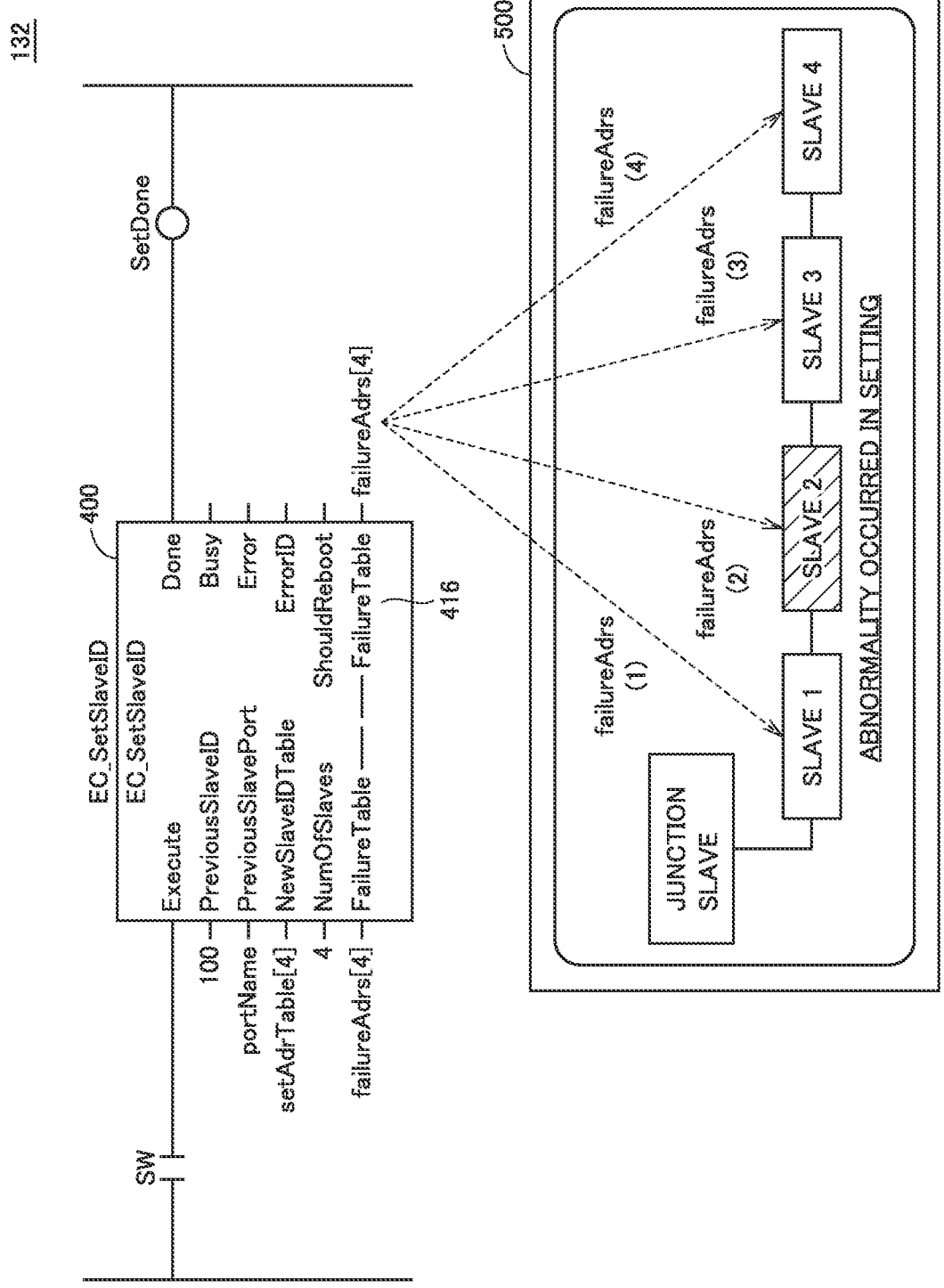
FIG. 22 is a diagram illustrating one example of a user program for implementing the presentation of information upon a failure of the execution of the slave ID set instruction according to the present embodiment.

FIG. 22 is a diagram illustrating one example of the user program 132 for implementing the presentation of information upon failure of execution of the slave ID set instruction 400 according to the present embodiment. The user program 132, shown in FIG. 22, is associated with a display device 500, which is a user interface for the operator.

More specifically, the values (an array) of FailureTable 416 are output from the slave ID set instruction 400 in the form of an array "failAdrs[4]" consisting of four members. In the example shown in FIG. 22, the slave ID set instruction 400 is specified to set four slave IDs to four slaves 200, respectively, and values, indicating whether four slave IDs are successfully set to four slaves 200, respectively, are stored in the variable "failAdrs[4]."

The respective member values "failAdrs(1)," "failAdrs(2)," "failAdrs(3)," and "failAdrs(4)" can be associated with a display object that indicates each slave 200 on the display device 500. The association of a mode of display with a corresponding variable value differentiates a mode of display (e.g., such as a color) of a display object corresponding to the slave 200 the setting of a slave ID to which is failed, from other display objects.

In other words, among the one or more specified slaves 200, the display device 500 visually presents the position of the slave 200 that the setting of a slave ID to which is failed, based on the values (array) stored in FailureTable 416. This allows an operator to know at a glance in which slave an abnormality has occurred.

Further association of the variable value with another information allows identification of a slave in which some abnormality has occurred, and readily determination of a cause of the abnormality.

K. Appended Note

The present embodiment as described above include technical ideas as follows:

Configuration 1

A control system (1), comprising:
a control apparatus (100) functioning as a master; and
a plurality of slaves (200) which are network-connected to the control apparatus, wherein
the plurality of slaves each have identification information (224),
the control apparatus comprises an identification information set means (102, 122) configured to execute a first instruction (400) to set specified identification information to each of one or more specified slaves, and
the identification information set means is configured to output first error information (416) indicating which slave that the setting of the identification information to which is failed, among the one or more specified slaves.

Configuration 2

The control system according to configuration 1, wherein
the identification information set means is configured to output an array of members corresponding to the one or more specified slaves, as the first error information.

Configuration 3

The control system according to configuration 1 or 2, wherein
the first instruction is configured to receive a table name (406) to which the first error information is to be output.

Configuration 4

The control system according to any one of configurations 1 to 3, wherein
the identification information set means is further configured to output second error information (413) indicating whether setting of the identification information to each of the one or more specified slaves is failed.

Configuration 5

The control system according to any one of configurations 1 to 4, wherein
the identification information set means is further configured to output third error information (414) indicating a reason for failure in setting of the identification information to each of the one or more specified slaves.

Configuration 6

The control system according to any one of configurations 1 to 5, further comprising:
a display device (500) configured to visually present a position of a slave that the setting of the identification information to which is failed among the one or more specified slaves, based on the first error information.

Configuration 7

The control system according to any one of configurations 1 to 6, wherein
the first instruction is executed as a part of a user program (130) executed at the control apparatus.

Configuration 8

The control system according to any one of configurations 1 to 7, wherein
the control apparatus further comprises an identification information read means (102, 122) configured to execute a second instruction (420), in which any one of the plurality of slaves is specified as a reference slave, to read identification information set to specified slaves other than the slave being specified as the reference slave.

Configuration 9

The control system according to any one of configurations 1 to 8, wherein
the control apparatus has configuration information (134) defining a connection arrangement of the plurality of slaves, and
the control apparatus further comprises a disable means (102, 122) configured to execute a third instruction (450, 451, 452, 453, 454, 455, 456, 457) to disable some or all slaves included in definition by the configuration information.

Configuration 10

A control apparatus (100) functioning as a master, the control apparatus comprising:
a controller (120) configured to network-connect the control apparatus to a plurality of slaves (200), the plurality of slaves each having identification information (224); and
an identification information set means (102, 122) configured to execute a first instruction (400) to set specified identification information to each of one or more specified slaves, wherein the identification information set means is configured to output first error information (416) indicating which slave the setting of the identification information to which is failed among the one or more specified slaves.

L. Advantages Effects

The control system according to the present embodiment can set any slave ID (or node address) to any unknown slave, using the slave ID set instruction executed on the user program. For this reason, even in a situation in which a changeover or the like occurs and a different slave ID has to be set to the same slave, necessary settings can be achieved only with the user program, without the use of the support apparatus.

Moreover, the slave ID set instruction according to the present embodiment can identify any unknown slave, using any slave having a valid slave ID as a reference slave, and then set any slave ID to the unknown slave. The use of the method of identification of any unknown slave using any slave as a reference slave allows the slave ID to be readily reset or changed, independent of the position address, etc.

Moreover, since the slave ID set instruction according to the present embodiment can set multiple slave IDs to multiple slaves, respectively, in a collective manner, a time required to reset or change the slave ID can be reduced.

Moreover, the slave ID set instruction according to the present embodiment can distinguish between a slave whose slave ID having set thereto can be reflected instantly and a slave whose reboot is required to reflect the slave ID having set thereto, over which the information about the slave whose reboot is required is output from the slave ID set instruction. For this reason, the operation of an operator in charge of a changeover, etc. can be readily assisted.

The slave ID set instruction according to the present embodiment also outputs the information identifying the position of the slave that the setting of a slave ID to which is failed. For this reason, troubleshooting can be facilitated. Since the slave ID set instruction according to the present embodiment further outputs an error code indicating a reason why the setting of the slave ID has failed, the troubleshooting is more facilitated, using the position of the slave that the setting of a slave ID to which is failed.

The presently disclosed embodiment should be considered in all aspects illustrative and not restrictive. The scope of the present invention is defined by the appended claims, rather than the above description. All changes which come within the meaning and range of equivalency of the appended claims are to be embraced within their scope.

REFERENCE SIGNS LIST 1 control system; 4 network; 6 internal bus; 20, 22 conveyer; 30, 40, 50 manufacturing module; 100 control apparatus; 102, 212, 302 processor; 104 chipset; 106, 214, 304 main memory; 108, 306 storage; 110 network controller; 112, 316 USB controller; 114 memory card interface; 116 memory card; 118 internal bus controller; 120, 202 field network controller; 122 instructions interface; 124 actual-configuration management component; 126 counter; 128 RTC; 130 system program; 132 user program; 134 configuration information; 150 the functional unit; 200 slave; 200J junction slave; 210 main controller; 216 storage register; 218 reload object; 220 nonvolatile memory; 224 slave ID; 226 firmware; 230 function circuitry; 250 indicator; 300 support apparatus; 308 input unit; 310 display unit; 312 optical drive; 314 recording medium; 318 processor bus; 320 OS; 326 support program; 400 set instructions; 420 read instruction; 450, 451, 452, 453, 454, 455, 456, 457 slave enabled/disabled switch instructions; 460 slave error reset instruction; and 500 display device.

The invention claimed is:

1. A control system, comprising:
a control apparatus, comprising a memory storing a program and a processor to execute the program, functioning as a master; and
a plurality of slaves which are network-connected to the control apparatus, wherein
the plurality of slaves each store identification information therein, and
the program, when executed, causes the processor of the control apparatus to:
execute a first instruction to set new identification information to each of one or more slaves specified from among the plurality of slaves; and
output first error information indicating for which of the one or more specified slaves the setting of the new identification information has failed, based on a result of setting the new identification information to each of the one or more specified slaves.

2. The control system according to claim 1, wherein
the program, when executed, causes the processor of the control apparatus to output an array of members corresponding to the one or more specified slaves, as the first error information, each member indicating whether the setting of the new identification information to the corresponding slave has failed.

3. The control system according to claim 1, wherein
to which the first error information is to be stored is included in the first instruction.

4. The control system according to claim 1, wherein
the program, when executed, causes the processor of the control apparatus to output second error information indicating whether the setting of the new identification information to each of the one or more specified slaves is abnormally terminated.

5. The control system according to claim 1, wherein
the program, when executed, causes the processor of the control apparatus to output third error information indicating a reason for failure in the setting of the new identification information to each of the one or more specified slaves.

6. The control system according to claim 1, further comprising:
a display device that visually presents a position of the one or more slaves the setting of the new identification information has failed among the one or more specified slaves, based on the first error information.

7. The control system according to claim 1, wherein
the program, when executed, causes the processor of the control apparatus to execute a second instruction, in which any one of the plurality of slaves is specified as a reference slave, to read identification information set to each of specified slaves other than the slave being specified as the reference slave.

8. The control system according to claim 1, wherein
the control apparatus has configuration information defining a connection arrangement of the plurality of slaves, and the program, when executed, causes the processor of the control apparatus to execute a third instruction to disable some or all slaves included in definition by the configuration information.

9. A control apparatus, comprising a memory storing a program and a processor configured to execute the program, functioning as a master, wherein the program, when executed, causes processor of the control apparatus to:

network-connect the control apparatus to a plurality of slaves, the plurality of slaves each storing identification information therein;

execute a first instruction to set new identification information to each of one or more slaves, specified from among the plurality of slaves; and output first error information indicating for which of the one or more slaves the setting of the new identification information has failed, based on a result of setting the new identification information to each of the one or more specified slaves.

10. The control apparatus according to claim 9, wherein the program, when executed, causes the processor of the control apparatus to output an array of members corresponding to the one or more specified slaves, as the first error information, each member indicating whether the setting of the new identification information to the corresponding slave has failed.

11. The control apparatus according to claim 9, wherein a table to which the first error information is to be stored is included in the first instruction.

12. The control apparatus according to claim 9, wherein the program, when executed, causes the processor of the control apparatus to output second error information indicating whether the setting of the new identification information to each of the one or more specified slaves is abnormally terminated.

13. The control apparatus according to claim 9, wherein the program, when executed, causes the processor of the control apparatus to output third error information indicating a reason for failure in the setting of the new identification information to each of the one or more specified slaves.

14. The control apparatus according to claim 9, further comprising:

a display device that visually presents a position of a slave that the setting of the new identification information to which is failed among the one or more specified slaves, based on the first error information.

15. The control apparatus according to claim 9, wherein the program, when executed, causes the processor of the control apparatus to execute a second instruction, in which any one of the plurality of slaves is specified as a reference slave, to read identification information set to each of specified slaves other than the slave being specified as the reference slave.

16. The control apparatus according to claim 9, wherein the control apparatus has configuration information defining a connection arrangement of the plurality of slaves, and the program, when executed, causes the processor of the control apparatus to execute a third instruction to disable some or all slaves included in definition by the configuration information.

\* \* \* \* \*